US012801608B2

(12) United States Patent
Pasupuleti et al.

(10) Patent No.: US 12,801,608 B2
(45) Date of Patent: Nov. 17, 2026

(54) METHOD AND SYSTEM TO IMPLEMENT REVALIDATION OF SQL PATCHES

(71) Applicant: Oracle International Corporation, Redwood Shores, CA (US)

(72) Inventors: Krishna Kantikiran Pasupuleti, Belmont, CA (US); Jiakun Li, San Mateo, CA (US); Mohamed Ziauddin, Pleasanton, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 19/181,158

(22) Filed: Apr. 16, 2025

(65) Prior Publication Data

US 2026/0329863 A1 Oct. 22, 2026

(51) Int. Cl.
*G06F 16/2453* (2019.01)
*G06F 16/242* (2019.01)

(52) U.S. Cl.
CPC .... *G06F 16/24545* (2019.01); *G06F 16/2433* (2019.01); *G06F 16/24547* (2019.01)

(58) Field of Classification Search
CPC ........... G06F 16/2433; G06F 16/24542; G06F 16/24544; G06F 16/24545; G06F 16/24547
See application file for complete search history.

(56) References Cited

U.S. PATENT DOCUMENTS

| | | | | |
|---|---|---|---|---|
| 10,754,974 | B2 | 8/2020 | Hentschel et al. | |
| 11,550,765 | B1 * | 1/2023 | Dai | G06F 11/3688 |
| 12,111,828 | B2 | 10/2024 | Pasupuleti et al. | |
| 12,380,103 | B1 | 8/2025 | Bove et al. | |
| 2003/0182276 | A1 * | 9/2003 | Bossman | G06F 16/217 |
| 2003/0200204 | A1 | 10/2003 | Limoges et al. | |
| 2004/0153435 | A1 | 8/2004 | Gudbjartsson et al. | |
| 2005/0050011 | A1 * | 3/2005 | Van Der Linden | G06F 16/284 |
| 2008/0091647 | A1 * | 4/2008 | Gao Zhong | G06F 16/2453 |
| 2008/0177694 | A1 | 7/2008 | Chaudhuri et al. | |
| 2017/0132286 | A1 * | 5/2017 | Baranczyk | G06F 16/24549 |
| 2022/0277010 | A1 * | 9/2022 | Zhou | G06F 16/24556 |
| 2022/0292197 | A1 | 9/2022 | Bandaru et al. | |
| 2023/0117461 | A1 * | 4/2023 | Pasupuleti | G06F 16/2453 707/721 |
| 2025/0086178 | A1 * | 3/2025 | Chong | G06F 16/242 |

FOREIGN PATENT DOCUMENTS

| | | |
|---|---|---|
| RU | 2015106007 | 9/2016 |
| WO | WO 9748039 | 12/1997 |

OTHER PUBLICATIONS

Final Office Action for U.S. Appl. No. 17/451,047 dated Nov. 2, 2023.
Final Office Action for U.S. Appl. No. 17/451,047 dated Jan. 26, 2023.

(Continued)

*Primary Examiner* — James E Richardson
(74) *Attorney, Agent, or Firm* — Vista IP Law Group, LLP

(57) ABSTRACT

Disclosed is an approach for applying fine-grained hints to obtain optimal control over error handling during query compilation. Disclosed is an approach to implement validation/revalidation of the patches.

15 Claims, 22 Drawing Sheets

(56) References Cited

OTHER PUBLICATIONS

Non-Final Office Action for U.S. Appl. No. 17/451,047 dated Jul. 21, 2023.
Non-Final Office Action for U.S. Appl. No. 17/451,047 dated Oct. 11, 2022.
Notice of Allowance for U.S. Appl. No. 17/451,047 dated Mar. 13, 2024.
"Lecture #3: Advanced Database Systems," Carnegie Mellon University, Query Compliation, dated 2018.
Pollack, E., "Query optimization techniques in SQL Server: the basics," SQLShack, URL: https://www.sqlshack.com/query-optimization-techniques-in-sql-server-the-basics/, dated May 30, 2018.
"8.9.3 Optimizer Hints," MySQL, URL: https://dev.mysql.com/doc/refman/8.0/en/optimizer-hints.html, date found via Internet Archive as Oct. 22, 2021.
"Overview of the SQL Compiler," IBM Administration Guide, URL: https://www.columbia.edu/sec/acis/db2/db2d0/db2d0103.htm#HDRCOMPOVW, date found via Internet Archive as Feb. 26, 2022, web archive URL: https://web.archive.org/web/20220226090057/https://www.columbia.edu/sec/acis/db2/db2d0/db2d0103.htm#HDRCOMPOVW.
Fritchey, G., "Controlling Execution Plans with Hints," Redgate, URL: https://www.red-gate.com/simple-talk/databases/sql-server/performance-sql-server/controlling-execution-plans-with-hints/, dated Nov. 12, 2009.
Hinsperger, J., "From the Archives—Customizing SQL Requests With Hints—Part Deux," SAP Community, URL: https://blogs.sap.com/2014/04/02/customizing-sql-requests-with-hints-part-deux/, dated Apr. 2, 2014.
Dieter, D., "SQL Server Hints Explained," SQL Server Planet, URL: https://sqlserverplanet.com/optimization/sql-server-hints-explained, dated Aug. 6, 2015.
Bayliss, N. "Adding and Disabling Hints Using SQL Patch," Oracle Optimizer, URL: https://blogs.oracle.com/optimizer/post/adding-and-disabling-hints-using-sql-patch, dated Jan. 1, 2020.
Colgan, M., "Using SQL Patch to add hints to a packaged application," Oracle Optimizer, URL: https://blogs.oracle.com/optimizer/using-sql-patch-to-add-hints-to-a-packaged-application, dated Feb. 27, 2020.
Jardot, N., "SQL Patch: Another way to change the plan without changing the code," dbi Services, URL: https://www.dbi-services.com/blog/sql-patch-another-way-to-change-the-plan-without-changing-the-code-1/, dated Mar. 10, 2014.
Lewis , J., "sql_patch," Oracle Scratchpad, URL: https://jonathanlewis.wordpress.com/2019/08/21/sql_patch/, dated Aug. 21, 2019.
Pachaly-Mischke, M., "SQL Patches—what hints do they exactly use?," dbamarco.wordpress.com, URL: https://dbamarco.wordpress.com/2015/11/09/sql-patches-what-do-they-do/, dated Nov. 9, 2015.
Biradar, B., "Exception Handling in Sql Server," SqlHints.com, URL: https://sqlhints.com/2014/01/20/exception-handling-in-sql-server/, dated Jan. 20, 2014.
Non-Final Office Action for U.S. Appl. No. 19/181,180 dated May 13, 2026.

* cited by examiner

```
SELECT *
  FROM t_10k f, t_5k d1, t_5k d2, t_5k d3,
    (SELECT * FROM t_5k d4 WHERE unique2 in (1,3,5)) v
    WHERE f.ten = d1.ten
      AND d1.ten = d2.hundred
      AND d3.unique1 in (1,2)
      AND f.hundred = d3.hundred
      AND d3.unique3 = 5
      AND f.thousand = v.thousand
      AND v.unique2 in (3,5,7)
      AND EXISTS (SELECT * FROM t_4k t4 WHERE t4.unique1 =
          f.unique2 AND t4.val=1);
```

Fig. 4A

METHOD AND SYSTEM TO IMPLEMENT REVALIDATION OF SQL PATCHES

BACKGROUND

Interactions typically occur with a database by submission of commands that cause the database to perform operations on database data. For the database server to process the commands, the commands typically conform to a database language supported by the database server. An example of a commonly used database language supported by many database servers is known as the Structured Query Language (SQL).

When a database server receives the database command (e.g., from a database application), the database server must first determine which actions should be performed in response to the database command, and then perform those actions. A query processor may process the database statement to prepare the acts necessary for performance of the desired actions within the database. The initial action to analyze and break the database statement into its constituent parts may be referred to as "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

It is relatively common for errors to be encountered during query processing that will prevent the query from properly being compiled. Any such errors that occur during the compilation process will most likely not allow the system to produce correctly operable code.

Identifying and resolving errors during compilation is a very difficult exercise in many database systems. If the errors are not adequately addressed, then they may become recurring errors that haunt multiple iterations of the compilation process, thereby resulting in many inefficient and wasteful cycles of compilation that could otherwise had been avoided if the error had been dealt with adequately in a previous compilation cycle. However, to ensure that such errors are resolved and do not appear again, some systems may apply burdensome solutions where advanced optimization options are completely removed from the next compilation cycle, thereby resulting in possibly sub-optimal and inefficient execution plans.

One approach to address this problem is to apply fine-grained hints to obtain optimal control over error handling during query compilation. These can be in the form of negative hints that are specific to a given query block and transformation.

What is needed is an improved approach to optimally control the scope of these hints. What is also needed is an approach to perform validation of the hints once they have been implemented.

SUMMARY

Embodiments of the present invention provide a system, method, and computer program product to control the scope of fine-grained hints and/or SQL patches that are used to implement the hints. In some embodiments, a determination can be made whether to use a SQL patch that is directed to one or more specific literal values, or whether the appropriate SQL patch to use includes a generic placeholder instead of the specific literal(s). Also disclosed is an approach to perform revalidation of the SQL patches.

Embodiments of the present invention provide a system, method, and computer program product to perform validation of SQL patches. In some embodiments, a determination can be made whether a previously established SQL patch is still needed, e.g., based upon a compilation of the SQL statement without the SQL patch. If no error is encountered, then it can be determined that the SQL patch is no longer needed.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 4A-D provide an illustrative example according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
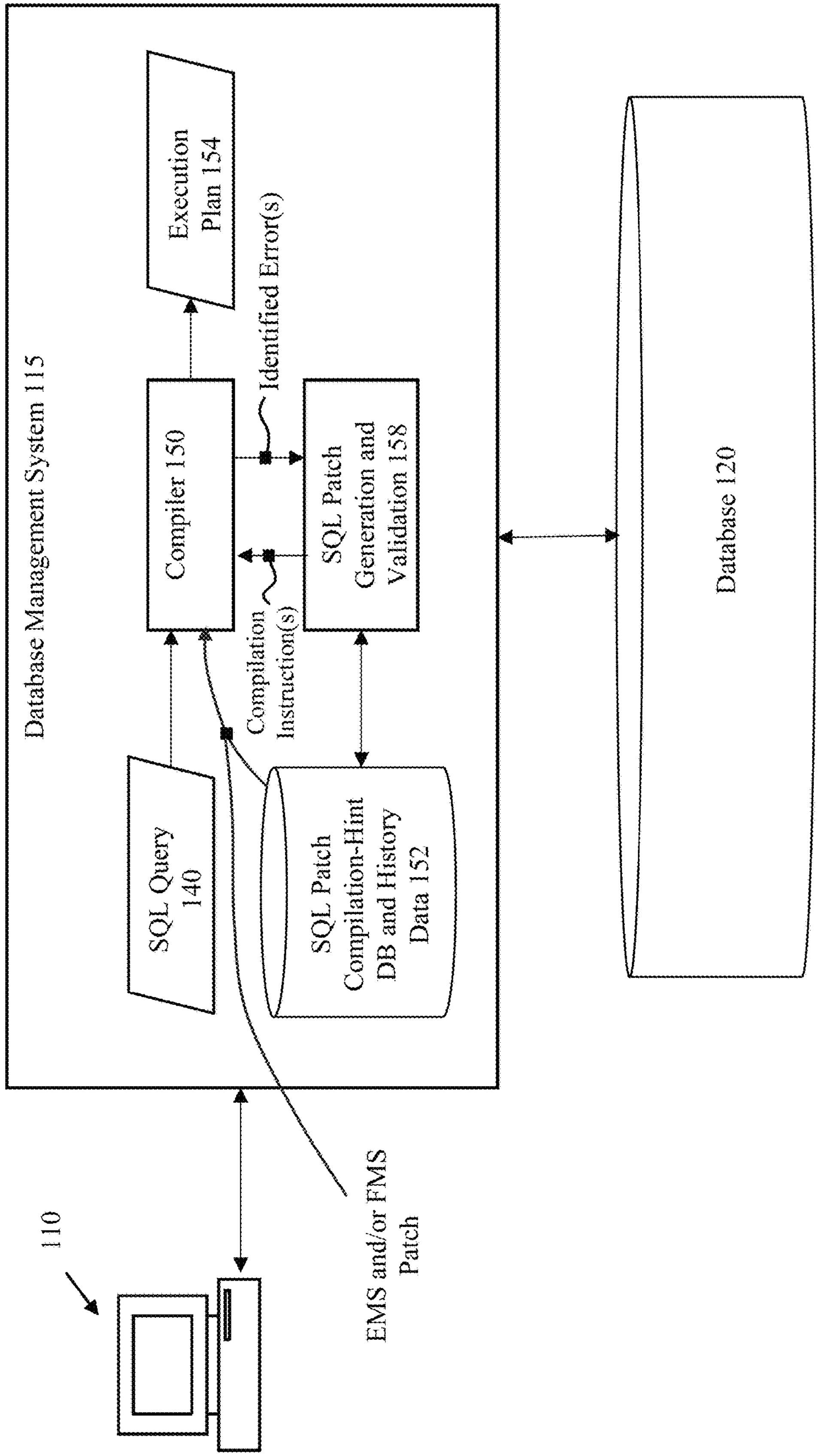
FIG. 1 illustrates a high-level diagram an embodiment of the invention.

FIG. 1 illustrates a high-level diagram an embodiment of the invention, which describes a system, method, and computer program product of a database system that provides a mechanism to control and/or validate the scope of SQL patches.

The database system may include one or more users or database applications within the system that operate from or using a user station 110 to issue commands to be processed by database management system (DBMS) 115 upon one or more database tables in a database 120. The user stations and/or the servers that host or operate with the database comprises any type of computing device that may be used to implement, operate, or interface with the database. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to a storage apparatus (e.g., a storage subsystem or appliance) over a network. The storage apparatus comprises any storage device that may be employed by the database system to hold storage content.

A database application or user may interact with the database system by submitting commands that cause the database system to perform operations on data stored that is stored in the database. The commands typically conform to a database language supported by the database server. As previously noted, a common example of a database language supported by many database servers is known as the Structured Query Language (SQL). When a database server receives the original statement of a database command from a database application, the database server must first determine which actions should be performed in response to the database command, and then perform those actions. The act of preparing for and/or determining for performance of those actions is generally referred to as compiling the database command, while performing those actions is generally referred to as executing the database command. A database "transaction" corresponds to an all or nothing unit of activity performed at the database that may include any number of different statements or commands for execution.

One or more SQL queries 140 may be received for processing by the DBMS 115. Each SQL query 140 may include one or more query blocks within the query, where each of the query blocks comprise a basic unit of execution within the query. A simple query may have only a single query block, while a complex query having multiple inline views or subqueries may possess multiple query blocks.

When compiling the SQL query 140, a compiler 150 within a query optimizer will consider the various query blocks within the SQL query 140, and determine how best to process the different query blocks to generate an execution plan 154. An execution plan 154 is a series of execution steps that are used by the database system to obtain a result set from operation of the SQL query. The execution steps will process according to an execution flow that considers, for example and without limitation, which tables will be accessed to satisfy the query, the order in which tables are accessed, the mechanism by which the table will be accessed (e.g., using an index or tablescan), the specifics of any join mechanisms, transformations to be applied to the various query blocks, and/or the method of application for predicates.

The compiler 150 is used to analyze the specific statements within the SQL query 140, and to project the set and order of execution steps within the execution plan. The compiler may consider various factors in its processing, including factors such as cost, time, rows, and data volume. The cost parameter pertains to a prediction of the amount of resources required for execution of a given operation for the query, including resources required for execution of descendent operations. These costs may be expressed, for example, as a unit or percentage of a resource (e.g., a CPU percentage for a CPU resource).

The time parameter pertains to a predicted elapsed time period for execution of an operation. The row parameter pertains to a prediction of a number of rows needed to be supplied for execution of an operation. The data volume parameter pertains to an amount of predicted data supplied for execution of an operation (e.g., in terms of bytes based upon number of rows times the row size).

In certain circumstances, the compiler may encounter one or more errors when compiling the SQL query. For example, during the compilation process, the compiler may have different choices for transformations that may be applied to a query block within the SQL query, and the wrong choice of a transformation for the query block may cause an error to occur during processing and/or execution of the query. As another example, code errors may also exist, which can be identified during the compilation process.

When an error is detected during compilation, it is important for the error to be adequately addressed by the database system before the query is recompiled again, since if the error is not addressed, then any subsequent recompilations of the query may simply repeat the same choices that caused the error in the first place.

To address these problems, embodiments of the invention provide an approach to implement fine-grained hints 152 for the compiler, where the fine-grained hints are precisely targeted only to specific query blocks within the SQL query. Each fine-grained hint identifies a specific query block to be addressed, along with the error to be avoided. For example, the fine-grained hint may identify a combination of a specific query block and a transformation. Only the specifically targeted query blocks in the fine-grained hints are prevented from being used, in a directed manner, with an identified transformation approach. While the inventive concepts disclosed herein are applicable to any type of fine-grained hint, the concepts may be particularly and illustratively explained in this document with respect to fine-grained hints having a combination of a query block and a transformation. Therefore, the inventive concept is not limited only to a type of hint that identifies a transformation.

This approach of using fine-grained hints allows the compiler to continue using all existing features of modern database systems for portions of the query that did not previously exhibit an error. However, for the targeted query blocks in the fine-grained hints, these hints will serve to prevent a previously-encountered error from happening again in any subsequent compilations of the query. The approach of using fine-grained hints therefore provides a solution that can be used to avoid errors during compilation, while also doing so in a manner that minimizes impact to overall query performance.

In some embodiments, a "SQL patch" is used as a vehicle to provide the hint to the optimizer/compiler. In this context, a hint is a directive to the query optimizer that the optimizer is obliged to follow during query compilation. If a hint is valid both syntactically and semantically it should be honored by the optimizer. The SQL patch is an object that may be located and persisted within the database's data dictionary as an object (e.g., as a "SQL plan management object"). The SQL patch is a mechanism used by certain databases (e.g., database products provided by Oracle Corporation) to address and/or avoid errors encountered during query processing that prevent query compilation/execution from proceeding. They can also be used to address performance issues and wrong results during query execution. The patches comprise a set of hints which when applied steer the query optimizer away from erroneous code paths thus avoiding errors during compilation. This document describes a mechanism to generate SQL Patches that operate at a finer level and do not alter query plans significantly thus retaining most of the features of the optimizer. The mechanism can be applied for errors that are raised during the logical transformation phase of queries.

The embodiment shown in FIG. 1 can be used to optimize the scope of the SQL patch that are used to implement the hints. The SQL patch generation and validation module 158 can be used to make a determination whether to use a SQL patch that is directed to one or more specific literal values, or whether the appropriate SQL patch includes a generic placeholder instead of the specific literal(s). There are several differences and/or benefits that derive from the use of each of these types of SQL patches. A literal-based patch would target only the specific statement using a specific literal. Therefore, this type of patch is useful when targeting a small set of distinct literals, since such patches would not disrupt other statements having different literals. In contrast, a generic-based patch would apply to any statement having a literal in a given location within the statement. The generic patch may be more efficient if many statements that differ only in a respective literal value have the same error.

A SQL patch database 152 may include a set of history data for the SQL patches that is accessed by the module 158 in forming a determination whether to use a literal-based SQL patch or whether to use a generic-based SQL patch. The SQL patch database 152 can be configured to include information, such as for example, a list of previous SQL patches, dates/times of previous application of the SQL patches, and/or counts of success or failures from prior compilation requests for underlying SQL statements.

The SQL patch generation and validation module 158 can also be used to validate the usage of previously established SQL patches. By consulting the information in the SQL patch database 152, the module 158 can make a determination whether a given SQL patch is still needed. A testing procedure may be implemented, where a compilation can be performed for an underlying SQL statement without the existing SQL patch. If no error is encountered, then it can be determined that the SQL patch is no longer needed for that statement.

Figure 2:
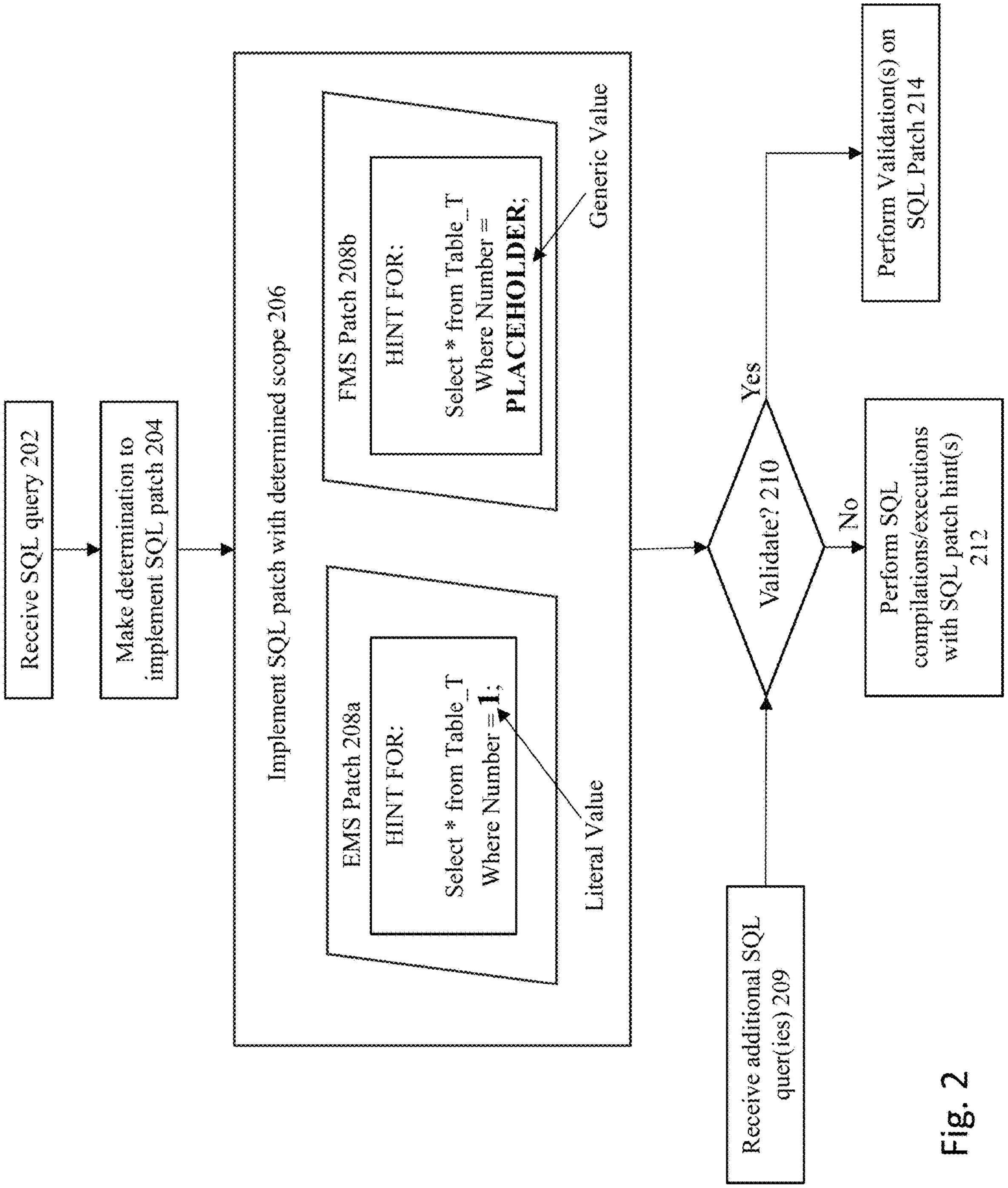
FIG. 2 illustrates a process flow to implement some embodiments of the invention.

FIG. 2 shows a high-level flowchart according to some embodiments of the invention. At 202, a SQL query is received for processing. Processing may occur to compile the SQL query in preparation for its execution within the database system.

A determination is made at 204 whether to implement a SQL patch for the SQL query. This determination can be made, for example, if an error occurs during compilation of the SQL query. At 206, the SQL patch is implemented for the database system. For example, in the context of a database system provided by Oracle Corporation (such as the Oracle Autonomous database), a feature called the "Automatic SQL Error Mitigation" can be used that internally catches errors during query processing and mitigates them by finding an alternate path of query processing. One of the mechanisms it uses for this purpose is to automatically create a SQL object for the SQL patch that contains the error-mitigating hints. This patch is persisted on disk in dictionary tables so that subsequent compilations of the same SQL statement continue to benefit from it and avoid the error.

The SQL patch may be implemented with a choice of different possible scopes for that SQL patch. In some embodiments, a first possible type of scope is to implement the SQL patch to be specific to one or more literals in the underlying query. A second possible type of type of scope is to implement the SQL patch to be generic to any literal in a specific given location in the underlying query.

To explain, consider that in database workloads, it is common to notice that the same SQL statement is often submitted with modified values of the literals in it. This results in many statements in the system that look exactly the same but for the different literal value. An issue addressed by this disclosure is that if SQL patches are created separately for each of these statements, the database may end up creating many SQL patches for very similar statements. If too many SQL patches are created in the system, this in turn may negatively affect the performance of the system as there is pressure on the specific tablespace. When such a situation arises, it is desirable for the system to adapt and manage the SQL patches appropriately so that the error(s) can be mitigated, but at the same time in an efficient and manageable manner by controlling the number of SQL patches.

Some embodiments of the invention provide a mechanism to manage the scope of SQL patches created by an automatic error mitigation framework that addresses errors affecting different SQL statements with varying literal values. This approach can be used to prevent and/or mitigate the creation of a large number of SQL patches that may lead to an adverse performance impact on the database system.

The database system may initially create SQL patches for statements using their fine-grain signatures which use the literal values as specified in the statements. A signature that pertains to a specific one or more literal values can be referred to as an Exact-Match signatures or EMS. This approach of using EMS to generate a SQL patch leads to separate patches for statements that differ only in the values of the literals.

With embodiments of the invention, the database system will keep track of these EMS-based SQL patches, and when a threshold is reached for these EMS-based SQL patches, then the system will begin to use a SQL patch that employs a more coarse-grained signature. The coarse-grain signature may be referred to herein as a Force-Match signatures or FMS, which ignores one or more of the literal values in the signature computation. In essence, a generic placeholder is used in place of a literal in the signature. This means that the FMS signature corresponds to a set of SQL statements with any literal value at a given position, which is different from an EMS signature that has a very specific literal value at that given position. Since the FMS-based SQL patch corresponds to multiple SQL statements in contrast to an EMS-based SQL patch that correlates to a single SQL statement, this approach can therefore reduce and/or eliminate the need for different patches for all such statements. This also ensures that subsequent (future) statements that share the same signature will benefit from the patch already in place and avoid errors. In other words, the signature defines the "scope" of applicability of the SQL patch-one statement or a set of statements.

At a later point in time, an additional SQL query may be received for processing. If there is an applicable SQL patch that already exists for the query, then at 210, validation may be performed to determine if the SQL patch is still useful and/or applicable for the database. The reason this type of check is performed is because changes to the database system over time may result in situations where a previous error that created the need for a SQL patch may no longer be present in the database. Various criteria may be established to decide whether validation is needed. If validation is needed, then at 214, validation is performed to determine whether to keep a given SQL patch. Otherwise if validation is not needed, then at 212, compilation of the SQL statement is performed with the existing SQL patch.

Figure 3:
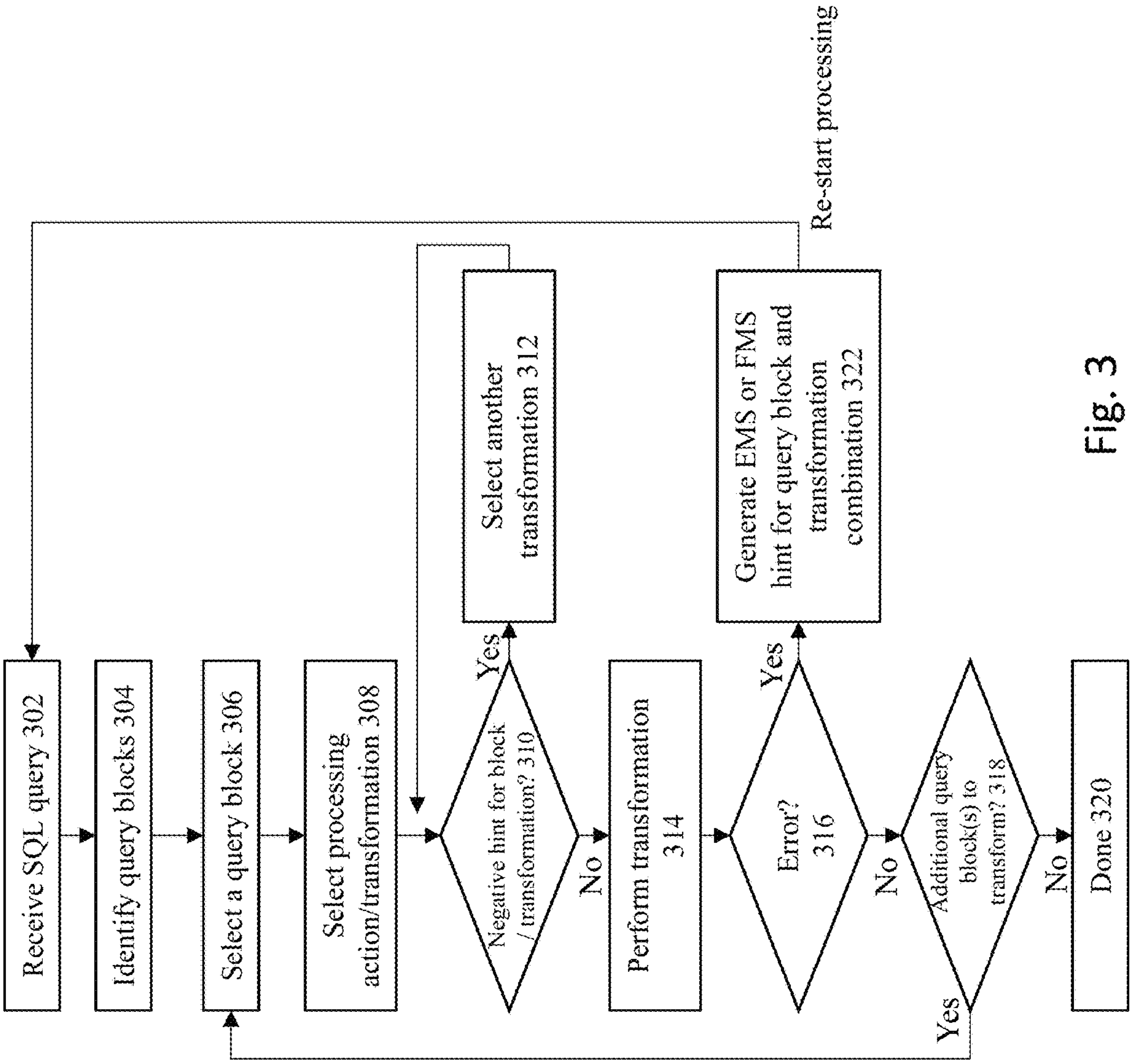
FIG. 3 illustrates a more-detailed process flow for generating a SQL patch according to some embodiments of the invention.

FIG. 3 illustrates a more-detailed process flow for generating a SQL patch according to some embodiments of the invention. At 302, a SQL query is received. It is noted that the present embodiment is described illustratively with respect to SQL queries, but the inventive concepts described herein are applicable to other types of queries or database query languages as well. Therefore, the scope of the invention is not to be limited only to "SQL" queries unless claimed as such.

At 304, one or more query blocks are identified within the SQL query. Each SQL query may include one or more query blocks within the query, where each of the query blocks comprise a basic unit of execution within the query. In general, any inline view or subquery of the SQL query corresponds to a separate query block. The query blocks may be named using keywords based upon the type of query block being named. For example, a query block corresponding to a SELECT statement may be associated with a "SEL$_" name, where a first SELECT query block is named as "SEL$1" and a second SELECT query block is named as "SEL$2".

In some embodiments, the query block corresponds to a unit of optimization within the query. In other words, it is at the granularity level of the query block in which a specific action can be applied to optimize processing for the query. Therefore, specific keywords in the query associated with the individual query blocks (e.g., SELECT, INSERT, UPDATE, DELETE, or MERGE) can be associated with hints to optimize the compilation process for the query.

At 306, a query block from among the one or more identified query blocks is selected for processing. Any suitable ordering for selection for the query blocks may be used. In one embodiment, the query blocks are selected for processing in the order in which they appear or are identified within the query, e.g., query block SEL$1 is processed ahead of query block SEL$2.

At 308, a specific processing action is selected for the query block, e.g., where a specific type of transformation is selected for application to the query block. A "transformation" is a specific technique or set of techniques used by the database optimizer to rewrite the query/query portion to a semantically equivalent query or query portion to improve query performance (e.g., where semantically equivalence in the database context corresponds to the production of the same query result set). There are multiple types of transformations that may be used in a database system. The following is a non-exclusive list of example transformations: (a) "OR Expansion", where the optimizer transforms a query with a WHERE clause containing OR operators into a query that uses the UNION ALL operator, e.g., so that more efficient access paths or alternative join methods are provided that avoid Cartesian products.; (b) "View Merging", where the optimizer merges the query block representing a view into the query block that contains it, e.g., where view merging can improve plans by enabling the optimizer to consider additional join orders, access methods, and other transformations; (c) "Predicate Pushing", where the optimizer "pushes" the relevant predicates from the containing query block into the view query block, e.g., where for views that are not merged, this technique improves the subplan of the unmerged view because the database can use the pushed-in predicates to access indexes or to use as filters; (d) "Subquery Unnesting", where the optimizer transforms a nested query into an equivalent join statement, and then optimizes the join, e.g., where this transformation allows the optimizer to consider the subquery tables during access path, join method, and join order selection; (e) "Query Rewrite with Materialized Views", where when the optimizer finds a user query compatible with the query associated with a materialized view, then the database can rewrite the query in terms of the materialized view, e.g., where this technique improves query execution because the database has precomputed most of the query result; (f) "Star Transformation", where the optimizer avoids full table scans of fact tables in a star schema; (g) "In-Memory Aggregation", where aggregation is performed while scanning to optimize query blocks, e.g., involving aggregation and joins from a single large table to multiple small tables, such as in a typical star query, where the transformation uses KEY VECTOR and VECTOR GROUP BY operations, since these operations use efficient in-memory arrays for joins and aggregation and are especially effective when the underlying tables are in-memory columnar tables; (h) "Table Expansion", where the optimizer generates a plan that uses indexes on the read-mostly portion of a partitioned table, but not on the active portion of the table, which is premised upon the fact that index-based plans can improve performance, but index maintenance creates overhead and as such, in many databases DML affects only a small portion of the data-which means that table expansion can use index-based plans for high-update tables where an index is created only on the read-mostly data, eliminating index overhead on the active data to allow table expansion to improve performance while avoiding index maintenance; and/or (i) "Join Factorization", where the optimizer can factorize common computations from branches of a UNION ALL query, where since branches in a UNION ALL query often refer to the same base tables, then without join factorization, the optimizer evaluates each branch of a UNION ALL query independently, which leads to repetitive processing, including data access and joins-therefore, join factorization transformation can share common computations across the UNION ALL branches thus avoiding an extra scan of a large base table and thus leading to a performance improvement.

A determination is made at 310 whether a negative hint already exists for the query block, e.g., for a selected combination of the query block and a given transformation. The negative hint may have been created during a prior compilation iteration based upon an error that was detected for this specific block/transformation combination. If so, then at 312, another transformation selected.

At 314, the selected transformation is applied to the query block. A determination is made at 316 whether an error has occurred based at least in part or whole for the transformation of the query block. Any suitable class of error may be identified with respect to step 316. For example, an "assertion error" is a type of error that may occur due to an inappropriate type of transformation applied to a query block. An assertion is a statement that allows one to test an assumption, and the assertion error is an error indicating that an assertion has failed, where an unexpected condition is identified that is not recoverable (e.g., regarding an assertion for the existence of a given index or access path).

When an error occurs during a query transformation in some embodiments, a SQL Patch is generated at 322 that avoids the particular transformation by generating an appropriate negative hint. Such errors include errors raised by the physical optimizer code as well (for example when transformation states are costed using physical optimizer APIs). The SQL patch that is generated may be based upon a signature that is an EMS type or an FMS type signature for the SQL patch.

At this point, since an error has occurred, the compilation process exits, and may return back to 302 to restart the compilation process again—although the next iteration will now include a negative hint for the specific query block/transformation combination that caused the previous error.

If, however, an error was not detected at 316, then the transformation was likely considered successful, and the processing continues to 318 to determine whether there are any further query blocks to process. If so, then the processing returns back to 306 to select another query block to process. If there are no further query blocks to process, then the current processing ends at 320.

Figure 4B:
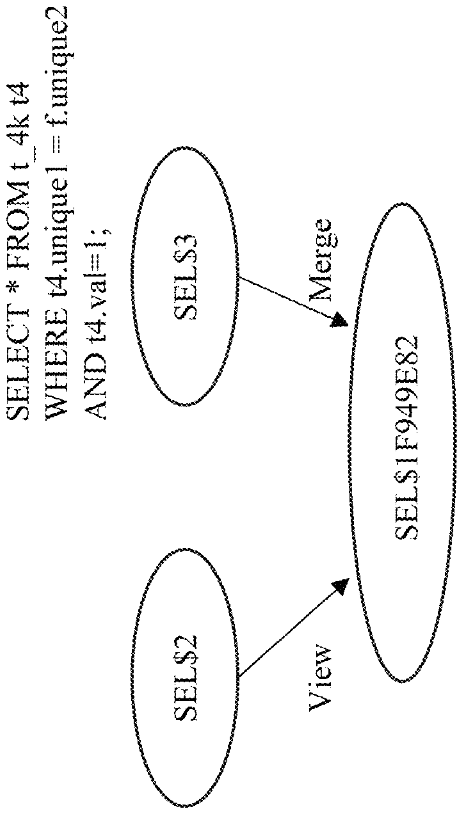

FIGS. 4A-D provide an illustrative example according to some embodiments of the invention for generating an EMS-type SQL patch. FIG. 4A shows an example SQL query 402. This example query 402 includes three query blocks, including query blocks SEL$1, SEL$2, and SEL$3. Query block SEL$1 corresponds to the outer SELECT statement, and SEL$2 and SEL3 correspond to subqueries that are located within the outer SELECT statement.

When query 402 is compiled, a cost-based query optimizer may apply a number of logical transformations in an attempt to arrive at an equivalent but more efficient query form. Such transformations are applied in a specific order. For example, in query 402, view 'v' can be merged into its outer query block while the subquery specified in 'v' can be unnested converting it into a semi-join.

A graphical representation of the query blocks and their respective illustrative transformations are shown in FIG. 4B. It is noted that query transformations generate new names for query blocks as they apply some "material" changes to the structure of the query. For example, subquery unnesting would rename both the subquery and the outer query block to mark the changes that these query blocks undergo as part of unnesting. The new names are generated using a hash function that works on the current names and other transformation related parameters. Thus, the query block names are unique. As current names of the query blocks are in turn based on prior transformations that were applied on them the names at any point in time, represent a "summary" of all prior operations performed on them in a specific order. It is necessary that for the same name to be generated in another instance of compilation, the same series of transformations are applied in the same order.

The hash function that is used to generate the new query block name when a transformation is applied (during the first compilation as well as subsequent re-compilations) uses all the inputs that are relevant for the operation. These inputs can be other query block names, table names and any other information that is relevant to the structure of the query block that is being modified. As a consequence, during re-compilations if the transformation is applied in the same way using the same inputs (query blocks, tables etc.), the hash function would produce the same name again. In other words it is deterministic and has both the following properties: (a) If all the inputs to the hash function are the same, the output name is identical; (b) If any of the inputs to the hash function are different, the output name is different.

The query block names can be viewed as a series of hash values that are generated for a query block based on the operations performed on them. The set of names generated for a SQL statement are captured and represented as a graph as shown in FIG. 4B. The query block names SEL$1, SEL$2 and SEL$3 correspond to the three query blocks in the original query. When the transformation "view-merging" is applied, and when query block SEL$3 is unnested into query block SEL$2, its name is modified to SEL$1F949E82.

The transformations therefore result in new query blocks that are deterministically associated with new and unique query block names. As previously noted, the view merge transformation with respect to query blocks SEL$2/SEL$3 results in a new query block that is named in a determinative way as SEL$1F949E82, which results from a hash function that takes the specific parameters of the transformation and its inputs to create the new query block name.

Figure 4C:
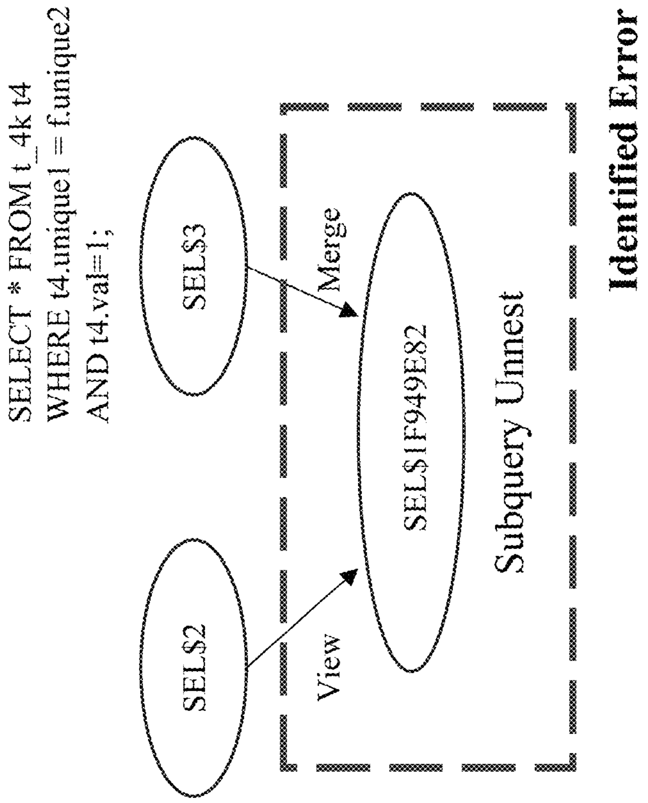

It is possible that an error is identified during the compilation process for a specific combination of a query block and transformation. As illustrated in FIG. 4C, consider if an error is detected for the "Subquery Unnest" transformation that is applied to the "SEL$1F949E82" query block. If an error is encountered during subquery unnesting for this query block, then the compilation may fail.

According to the current embodiment of the invention, when an error is caught in the query transformation phase, a negative hint for the transformation is generated on the name of the query block at that point. The negative hint thus is "conditional", disabling the transformation on that particular query block name. This is a desirable result because if in another instance of compilation, the query block name happens to differ (because one or more prior transformations did not take place in the same way) the negative hint would be ineffective in disabling the transformation. The justification is that the query block differs in its structure (by virtue of having a different name), and therefore it is possible the code path of the transformation is no longer faulty and hence continuing to apply the transformation is preferred.

Figure 4D:
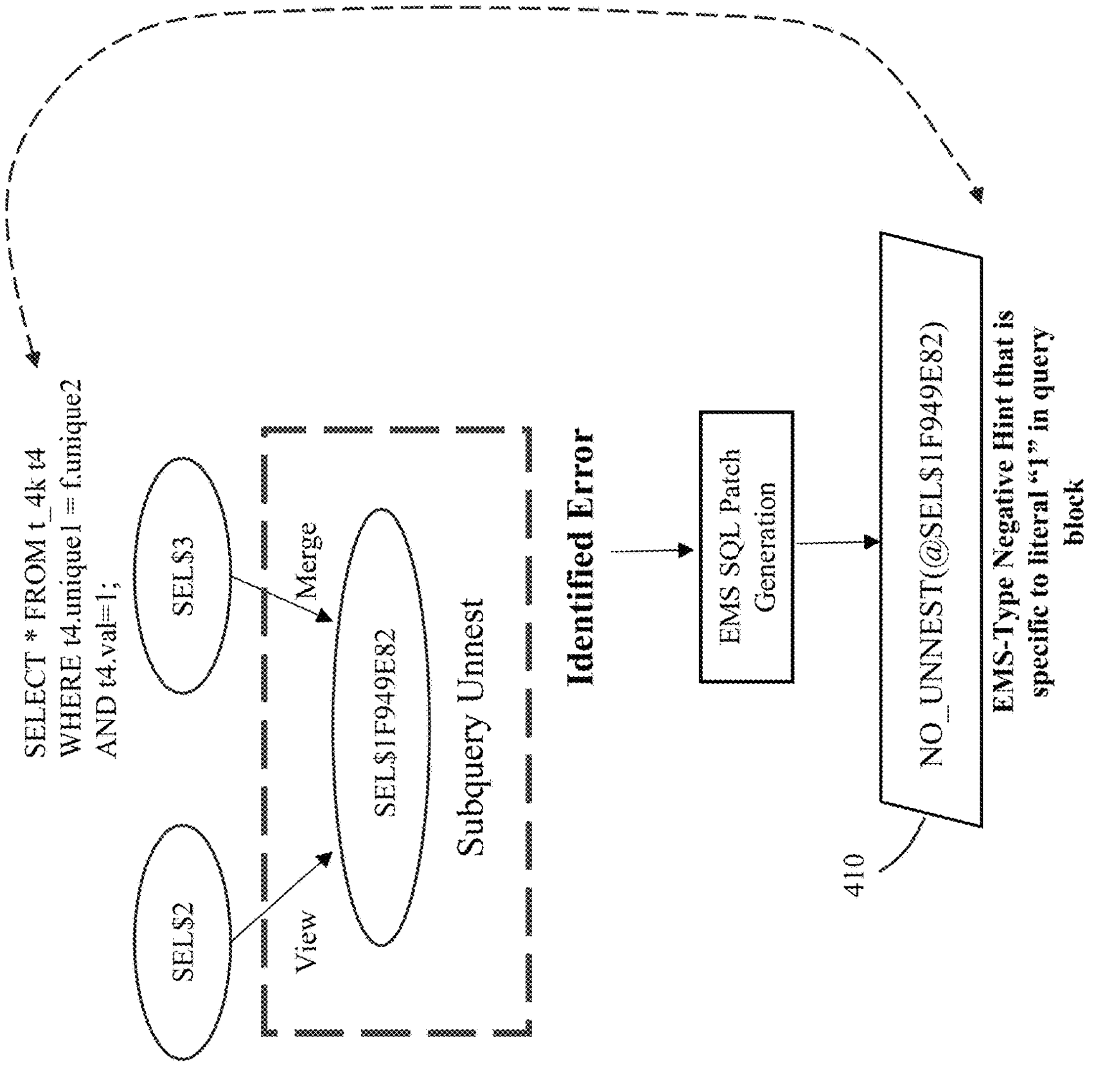

In the current illustrative example as shown in FIG. 4D, when an error is encountered during subquery unnesting, a negative hint NO_UNNEST (@SEL$1F949E82) is generated at 410, and added to the SQL Patch. The query block name SEL$1F949E82 captures the essence of prior transformations on the query block (here, view-merging).

What is notable is that the SQL patch is an EMS-type SQL patch that directly corresponds to a specific literal value in the SQL statement. Here, the value “1” exists as a literal in the SQL statement (as part of the predicate condition “t4.val=1”). Therefore, the SQL patch that is created for this statement is an EMS-type patch that corresponds to this exact literal value in the statement.

The negative hint is effective only if the query block SEL$1F949E82 is generated and not otherwise. This is similar to stating, “if all the prior operations happened on the query block exactly in the same way when the error was initially encountered during subquery unnesting, disable the transformation on the query block”. As such, for this EMS-type SQL patch, this SQL patch would not be applied even if the exact same statement is later received with a different literal value in place of the value “1”.

This document will now describe an approach to adjust the scope of applicability of the SQL patches that may be used with respect to a given SQL statement.

With the current embodiment of the invention, when a SQL statement encounters an error for the first time (e.g., there are no pre-existing SQL patches either at EMS or at FMS level), then the system will choose to create the new SQL patch at the EMS level. This is based upon an assumption that the error that was just seen likely affects only the SQL statement with the specific literal values. This is a reasonable assumption to being with, in the absence of any evidence that the error may be widespread.

Subsequently when similar SQL statements—that differ only in the literal values—hit the same error, the system will create patches for them using their EMS handles. This same sequence will be repeated until a configurable threshold is reached, which provides an indication that the error may be widespread. After this event, the next patch for the statement is created using its FMS handle.

There is a many-to-one relationship between EMS and FMS handles of a set of SQL statements, i.e., a set of SQL statements that have the same FMS value have different EMS values because EMS computation considers the values of literals, while FMS computation ignores them. The relationship can thus be considered to be a hierarchical relationship.

At any given point in time, there may be a few EMS patches for some statements and one FMS patch for the entire set. After an FMS patch has been created, subsequent statements with new literal values (that map to the same FMS) would use the FMS patch that is available. In some embodiments, statements with old literal values that are re-submitted continue to use their corresponding EMS patches. In an alternate embodiment, even statements with the old literal values will use the FMS patch.

After attaching the appropriate patch, if the compilation fails, the system can indicate that the corresponding patch has become ineffective and needs to be replaced. If the patch is an EMS patch, the statement would switch to using the FMS patch to check if the error is mitigated. Otherwise, the system can re-perform the above-described processing to find a new workaround. It is noted that the required to re-invoke the patch-generation process can be avoided by using an available FMS patch. If the patch is an FMS patch, the system can perform processing to find another workaround that replaces this patch.

It is noted that information about the scope of the patch (EMS/FMS) is stored in a database dictionary table along with corresponding signatures.

The benefit of different scopes of patches is that once an error starts to affect many statements, it can be reined-in with a single FMS patch instead of many EMS patches. This approach also serves to avoid repeated runs of the AEM driver which may be expensive.

Figure 5:
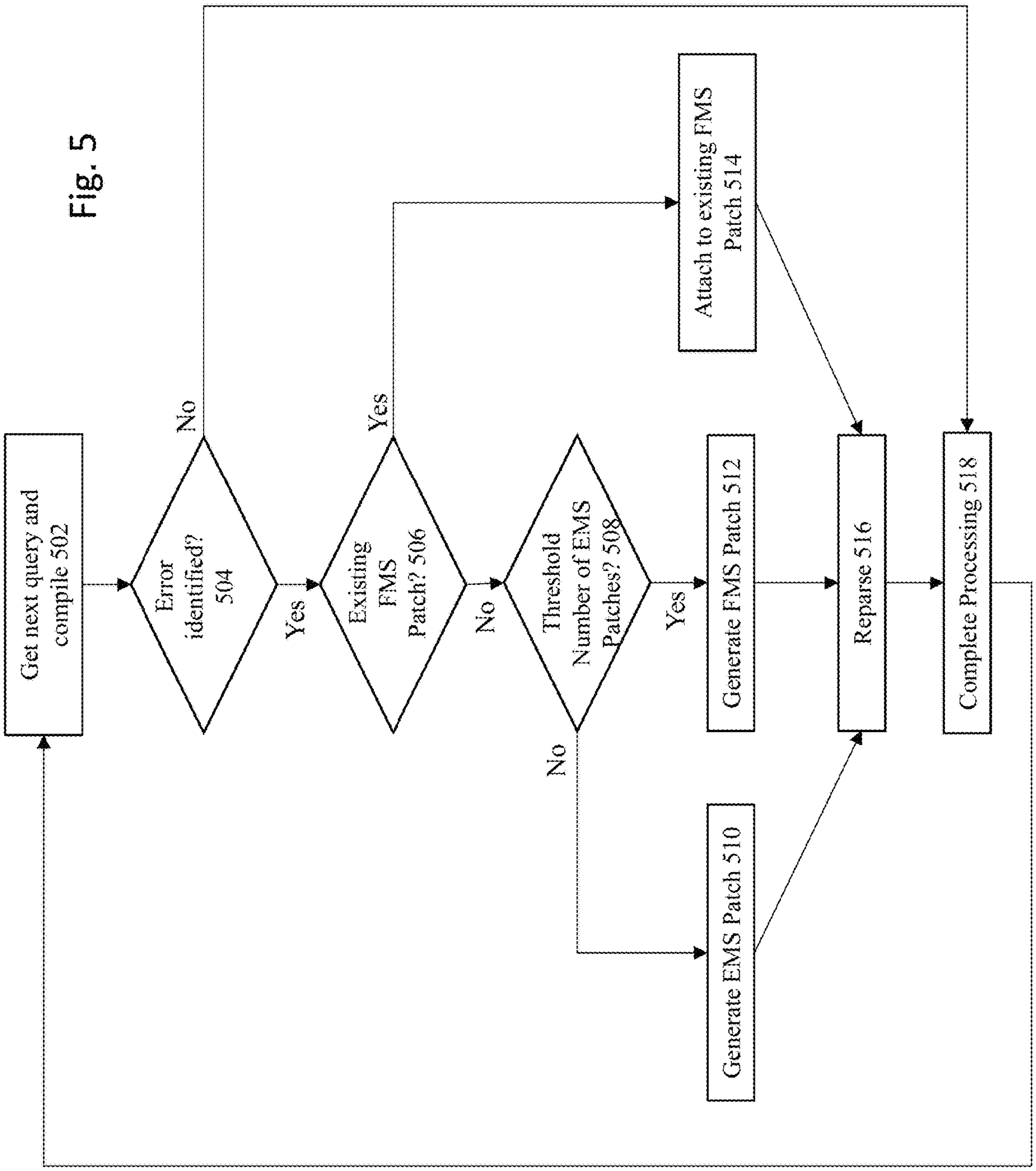
FIG. 5 shows a flowchart of an approach to determine whether an FMS-type SQL patch should be generated.

FIG. 5 shows a flowchart of an approach to determine whether an FMS-type SQL patch should be generated. This approach is used to adjust the scope of applicability of the SQL patches that may be used with respect to a given SQL statement.

At 502 a SQL query is received for processing. As previously noted, while the present embodiment is described illustratively with respect to SQL queries, the inventive concepts described herein are applicable to other types of queries or database query languages as well. Compilation is then performed upon the SQL query.

At 504, a determination is made whether any errors are identified from the compilation process. In some embodiments, identification of errors is made on a block-by-block basis, where each SQL query may include one or more query blocks within the query, and where each of the query blocks comprise a basic unit of execution within the query. The error that is identified may be with regards to a specific processing action that is selected for the query block, e.g., where a specific type of transformation is selected for application to the query block. If an error in not encountered, then processing continues with execution of the compiled statement at 518.

However, if an error is encountered, then at 506, a determination is made whether a FMS type SQL patch already exists that corresponds to the statement. What this indicates is that there have already been multiple previous iterations of compilations for the same statement that resulted in errors, but with different literals. Therefore, in this situation, at 514, the current statement is attached to the existing FMS patch.

If no existing FMS statement exists, then a determination is made at 508 whether the number of EMS patches for the statement has already reached a threshold number. If not, then an EMS-type patch is generated for the statement at 510. If a counter is being maintained for the statement, then that counter is incremented at this point.

If the number of EMS patches for the statement has reached a threshold number, then at 512, an FMS-type patch is generated for the statement. The FMS-type SQL patch can be generated using any suitable approach for creating a generic version of the patch that is applicable to multiple statements that are otherwise the same except for differing literal value(s). For example, one possible approach is to insert a bind variable or any other normalized value to replace a literal at the location of that literal in the statement.

Figure 6A:
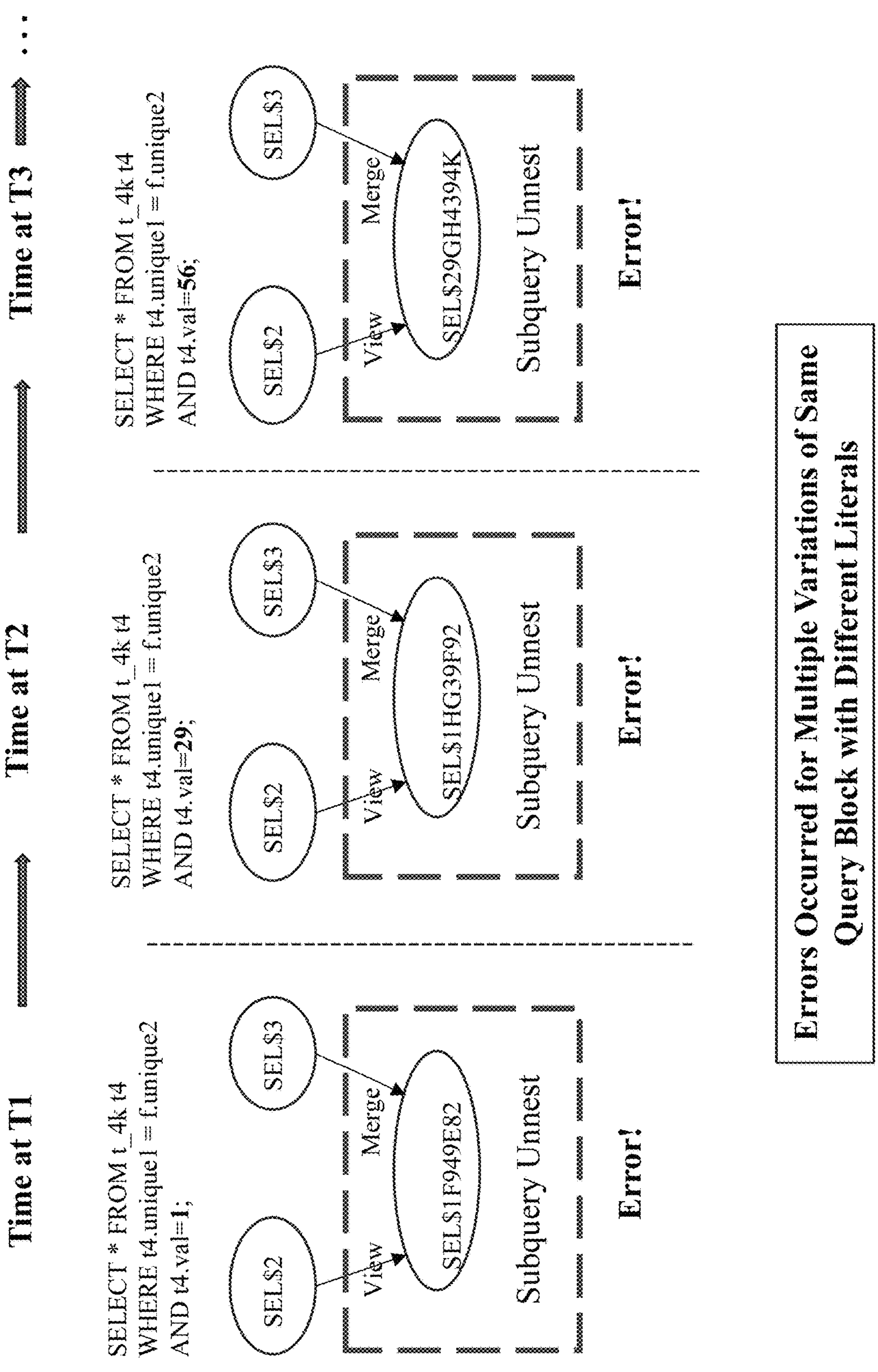
FIGS. 6A-C provide an illustration of a process to determine whether an FMS-type SQL patch should be generated.
Figure 6B:
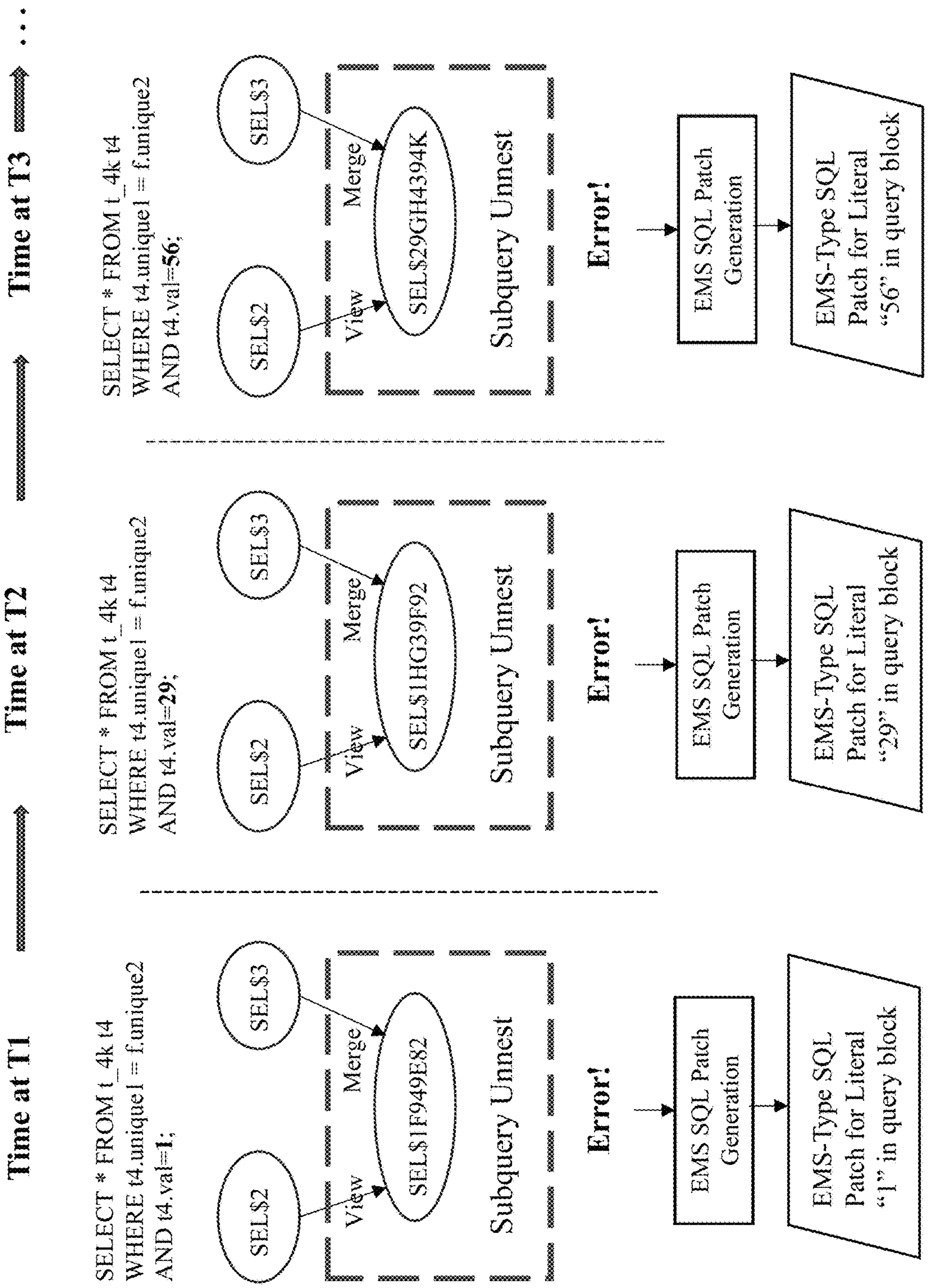
Figure 6C:
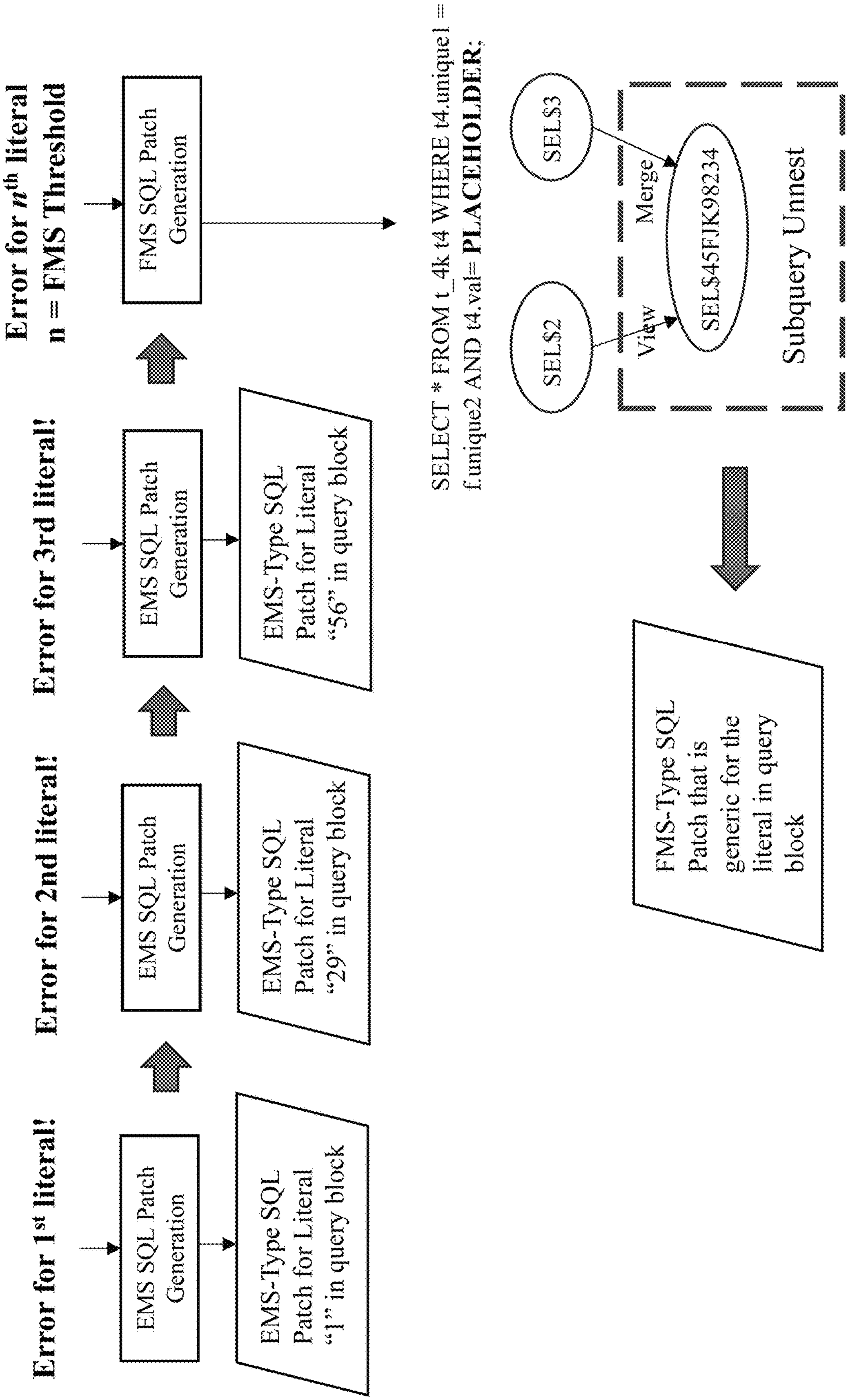

FIGS. 6A-C provide an illustration of this process. For this illustrative example, assume that the threshold limit to generate a FMS patch is 3, where if an error would require the generation of a fourth EMS patch for a given statement, then the system will instead create a new FMS patch.

FIG. 6A shows three different errors that have occurred for a query block SEL$3 at three different points in time. Here, each of the errors pertain to the same query block, but where there is a difference of a literal value at the same location in the query block at each subsequent iteration of that query block being processed.

As shown in FIG. 6B, each error results in the generation of a separate EMS SQL patch. Therefore, a first EMS patch is generated at time T1 for the iteration of the query block with the “1” literal, a second EMS patch is generated at time T2 for the second iteration of the query block with the “29”

literal, and a third EMS patch is generated at time T3 for the third iteration of the query block with the "56" literal.

FIG. 6C shows what happens when an error occurs at the very next iteration of the query block being processed and resulting in an error. As previously noted, the threshold limit for this illustrative example is 3. Therefore, if an error would require the generation of a fourth EMS patch for a given statement, then the system will instead create a new FMS patch. Here, since there are already three previous EMS patches for this query block, this means that any subsequent error that occurs for the query block will result in the creation of a FMS type SQL patch. The FMS patch can be created by inserting a placeholder into the statement to replace the literal value, and to then use the resultant signature with the placeholder to generate the FMS SQL patch.

One possible downside with just using a threshold value to make the determination of whether to use a FMS patch is that by itself, the threshold may not necessarily provide an accurate assessment of the optimal circumstances where an FMS patch is needed. To explain, compare two different example situations where the overall percentage of errors may differ from each other. In the first example situation, if the query block is compiled 1000 times with different literal values, this will result in errors for all 1000 iterations. In the second example situation, consider if the query block is compiled 1000 times, the circumstances are such that 9996 of those compilations will be successful and only 4 will result in an error. In both situations, after the 4th error occurs, then an FMS patch will be created that will prevent the erroneous transformation from being performed again for all literals. For the situation where all or almost all iterations of the query block processing will result in an error, the use of a FMS patch obviously makes a lot of sense, However, for the situation where only a small percentage of the literal values will result in an error, then it is likely to be very inefficient to create an FMS patch that blocks the transformation for all literal values for that query block.

Figure 7A:
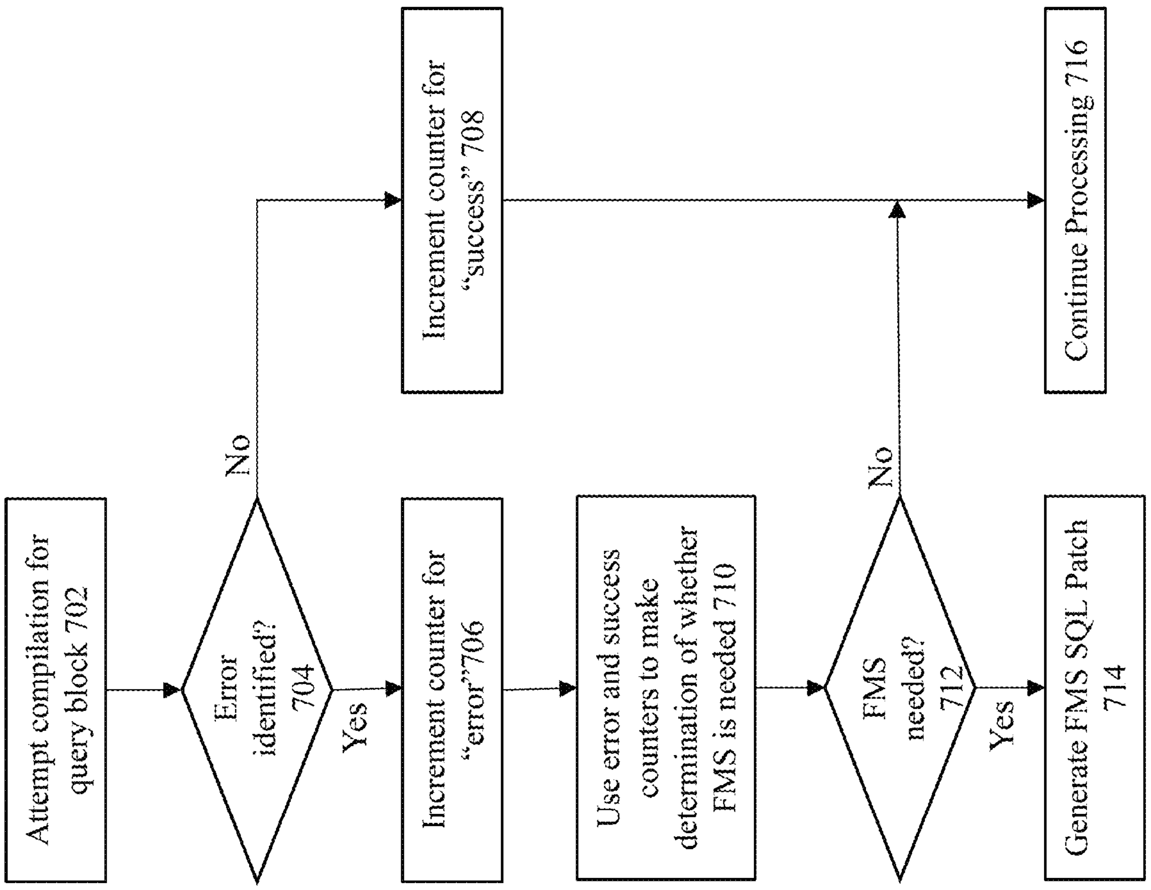
FIG. 7A shows a flowchart of an approach to use one or more counters.

FIG. 7A shows a flowchart of an approach to use one or more counters to address this situation. The general idea is that instead of using just a threshold value by itself, the system will, instead or in addition, use counter(s) to track the number of saucerful compilations and/or the number of error situations. The decision whether to create a FMS patch can be made by analyzing the comparative number of successes and failures, or the timing and sequences of such successes and errors.

At 702, an attempt is made to compile a given query block. A determination is made at 704 whether an error has been identified for the compilation attempt. If successful, then at 708, a success counter is incremented. If unsuccessful, then at 706, an error counter is incremented.

If an error is identified, then at 710, a determination is made whether a FMS patch is needed. In particular, in addition to looking at a threshold value, the system will also look at the number of errors compared to the number of successes to determine whether to create the FMS patch. For example, a threshold percentage value may be created, where if the percentage of errors exceeds the threshold percentage, then the FMS patch will be created. In addition, a weighting or bias can be applied to give more recent results a higher weight than less recent results. This will allow trends resulting from more recent changes in the system to bias the decision more in favor of recent results versus past results, Therefore, at 712, a decision is made whether to create a FMS patch. If the decision is made to not generate a FMS patch, the processing continues at 716. However, if the decision is made to create the FMS patch, then the FMS-type patch is generated at 714.

Figure 7B:
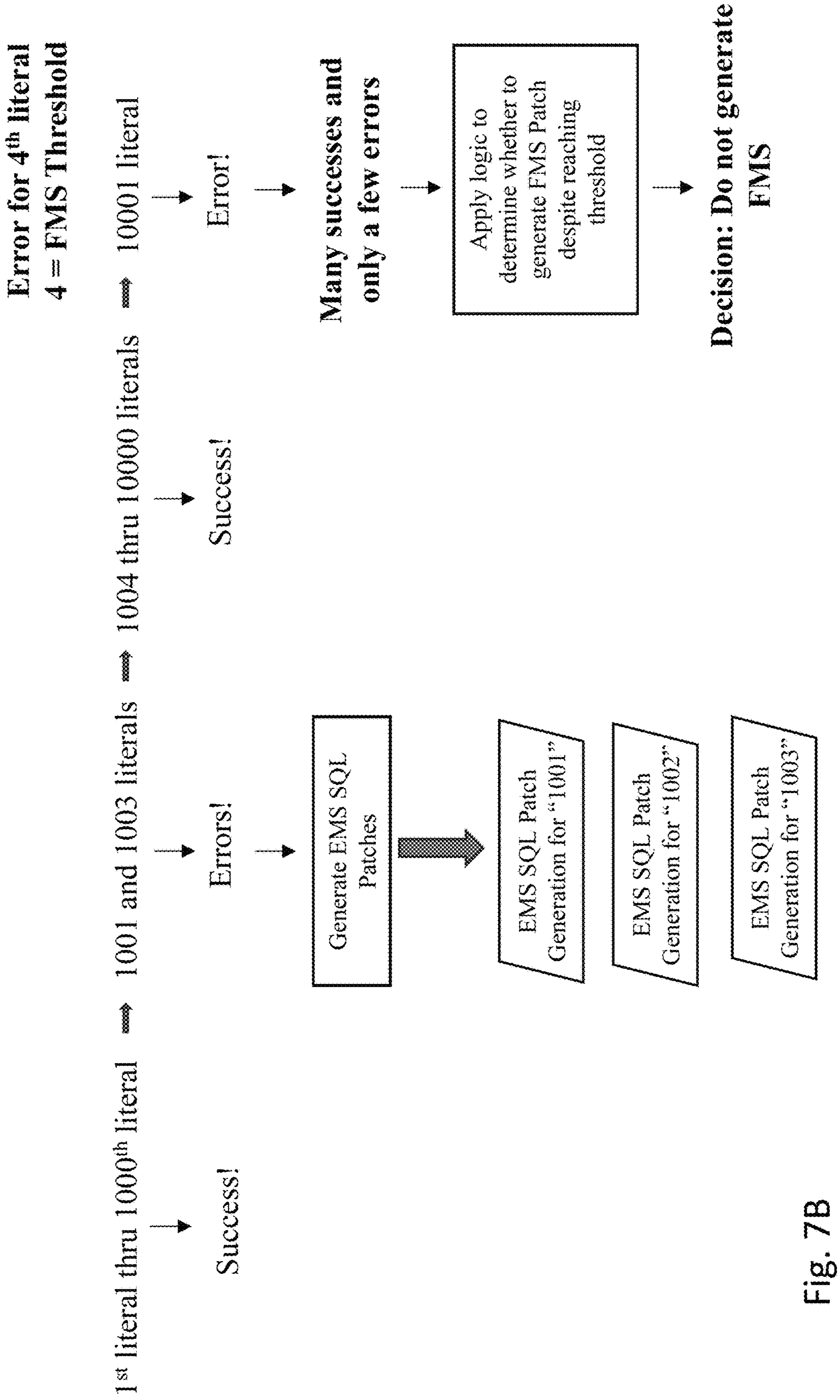
FIGS. 7B-D show example illustrative situations for using counters.

FIG. 7B shows an example illustrative situation for this aspect of embodiments of the invention. Here, the first 1-1000 iterations of compilations of the query block results in successes. However, three failures occurred in iterations 1001-1003. This results in EMS type patches being created for the query block with the specific literal values for these three iterations. This was followed by many more successes in iterations 1004-10000. At iteration 10001, another failure occurred. At this point, the number of errors has exceeded the threshold, and thus the question is whether a FMS patch should be created for the query block. In this situation, given that there is an extremely large number of successes and a very small number/percentage of errors, it is likely to be the case that a FMS SQL patch should be rejected.

Figure 7C:
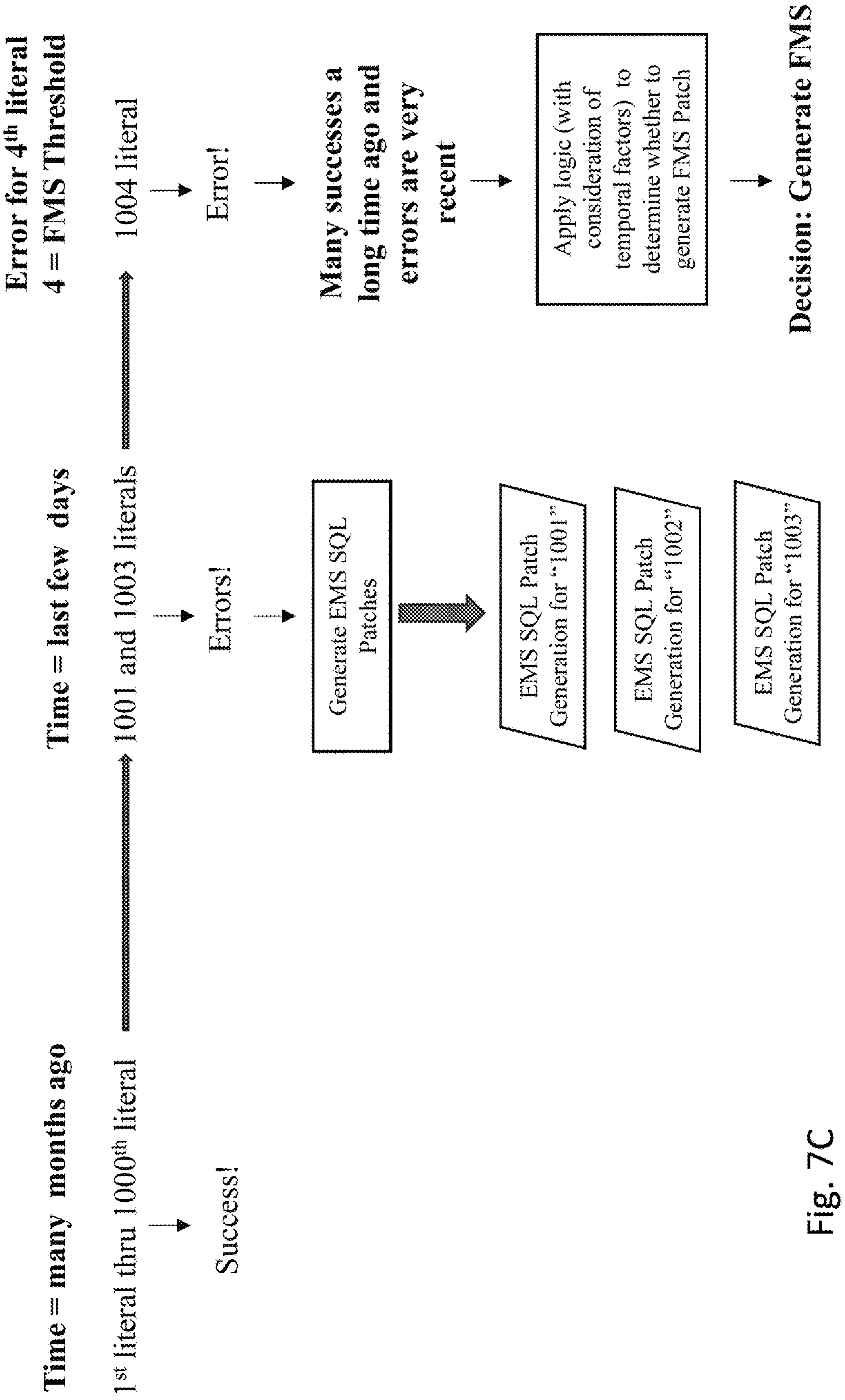

FIG. 7C shows another example illustrative situation. Here, the first 1-1000 compilation iterations result in successes. However, those successes occurred relatively far in the past. In the very near recent times, numerous errors occurred in iterations 1001-1003. At iteration 1004, another error has occurred. At this point, the number of errors has exceeded the threshold, and thus the question is whether a FMS patch should be created for the query block. In this situation, if greater weight is given to more recent results as compared to results from distantly in the past, then it is possible that a decision is made to generate a FMS SQL patch. This is despite the fact that the number of successes may be more than the number of failures.

Figure 7D:
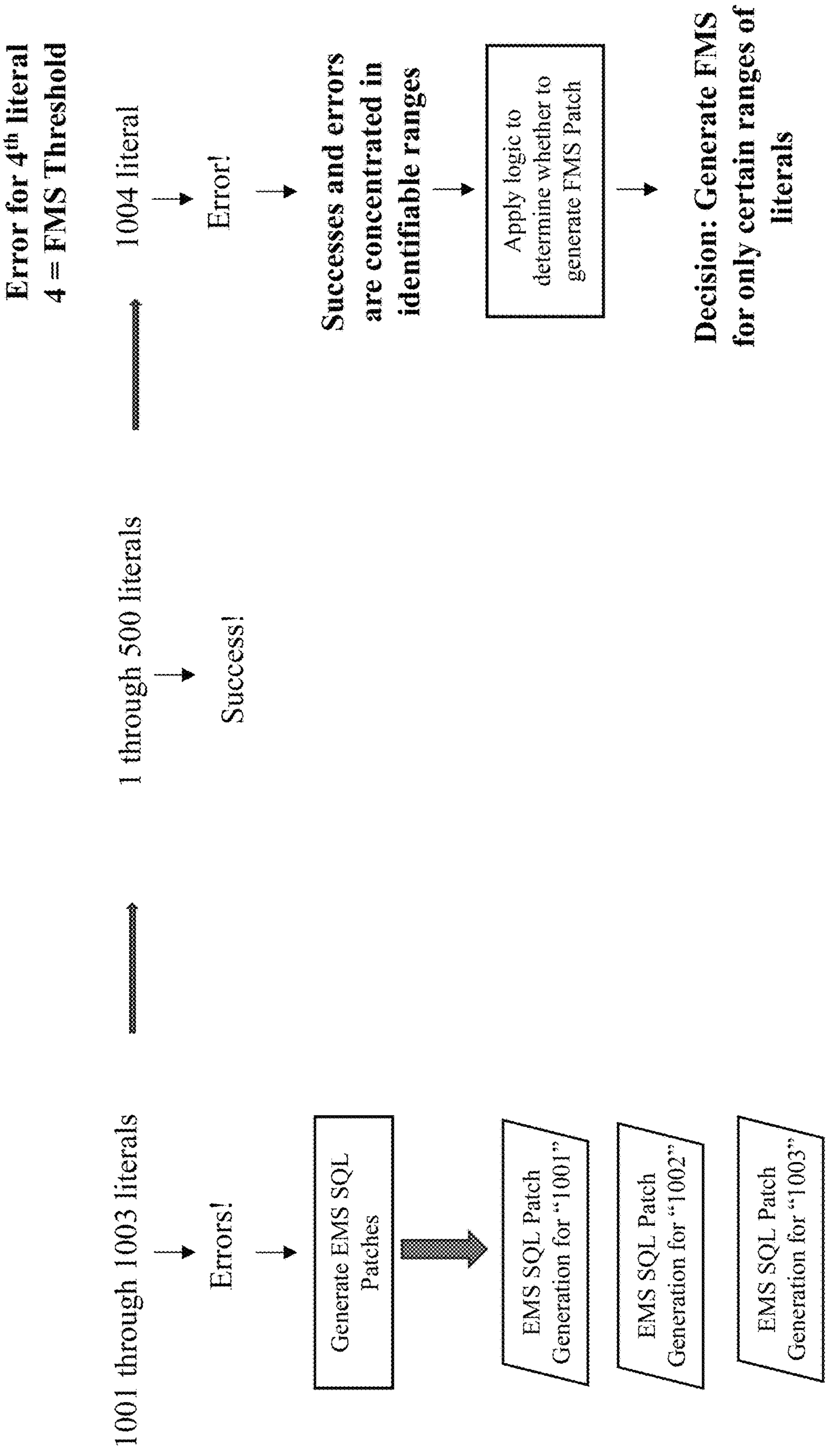

FIG. 7D shows yet another illustrative situation. Here, the iterations associated with compilation of a query block that pertain to 1001-1003 literals all resulted in errors. However, the iterations associated with compilation of a query block that pertain to 1-500 literals all resulted in successes. At a later point in time, another error was identified for the 1004 literal. At this point, the number of errors has exceeded the threshold, and thus the question is whether a FMS patch should be created for the query block. In this situation, an analysis can be performed against the actual literal values that resulted in the errors versus the literal values that resulted in successes, and a determination of a FMS may be scoped from that analysis. For the current example, it may be that a specific range literals can be identified that is more likely to result in an error as compared to a range that is more likely to result in a success. The signature for the FMS patch can thus be adjusted to address one or more literal value ranges that are more likely to result in an error.

Queries may contain multiple predicates each containing different literals. This means that the query hint may include a EMS or FMS patch that may pertain to multiple literals and/or multiple combinations of literals. Any of the above-described techniques may be applied with consideration of multiple literals within a SQL statement so that the query hints are managed efficiently for processing the workload in the database system.

This disclosure will now describe an approach to periodically and automatically revalidate the error-mitigating SQL patches that have been generated by the database system.

Figure 8:
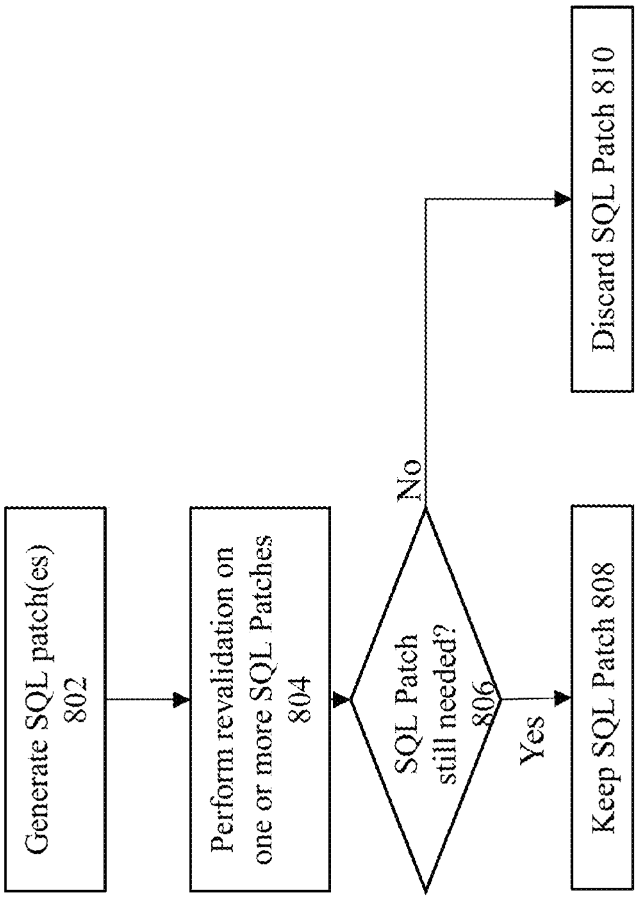
FIG. 8 shows a high-level flowchart for performing revalidation according to some embodiments of the invention.

FIG. 8 shows a high-level flowchart according to some embodiments of the invention. At 802, one or more SQL patches are generated. As discussed above, some embodiments provide functionality for a database that can internally catch errors during query processing and to mitigate them by finding an alternate path of query processing. The database can use a mechanism to automatically create a SQL object called SQL patch that contains the error-mitigating hints. This patch is persisted on disk in dictionary tables so that subsequent compilations of the same SQL statement continue to benefit from it and avoid the error.

At 804, revalidation is performed on the one or more SQL patches. The issue is that the database environment may change over time in a manner that affects whether existing SQL patches are still useful. For example, over time the database might undergo changes such as a change to statistics that are maintained for tables and indexes in the system. As such, previous compilation errors that may have occurred in the past may no longer occur for some statements due to these types of changes to the database. Additionally, as the underlying database code/binary may be updated over time (e.g., when the DB binary is refreshed regularly in a DB cloud environment), bugs that previously caused errors may have now been fixed thus rendering certain patches unnecessary.

As patches contain hints, they may affect the quality of query plans, and it is desirable to remove them when not required. The process of identifying if a patch is required is referred to as either "revalidation" or "validation" (which may be interchangeably referred to herein). In some embodiments, the revalidation/validation process can be performed automatically.

The general idea according to some embodiments is that the database system would choose to periodically revalidate a SQL patch for a statement that is compiled if the prior revalidation of the patch occurred some time ago. The specific time period can be identified by a configurable threshold.

Therefore, at 806, the revalidation process will determine if a given SQL patch is still needed. If the revalidation process determines that the patch is no longer required, then at 810, the patch is dropped. Otherwise, at 808, the patch remains, and the last-revalidated time is updated. In the latter case, the SQL statement is transparently re-parsed so that the end user or application who submitted the query is unaware of this process of revalidation.

The focus is on improving the customer experience while also ensuring the query plans continue to evolve and not be constrained by patches that are no longer necessary.

Figure 9:
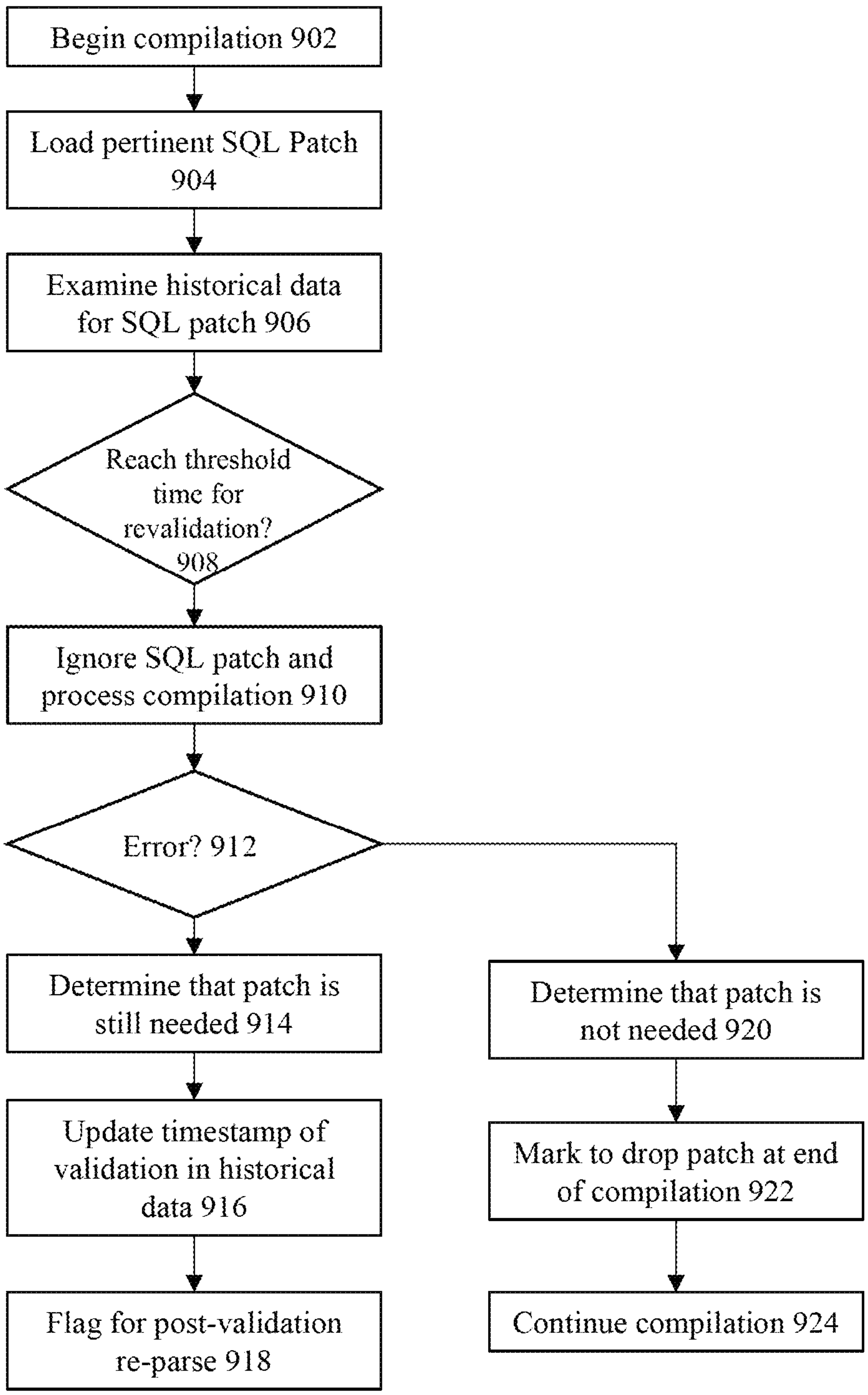
FIG. 9 shows a more detailed flowchart of an approach to implement revalidation according to some embodiments of the invention.

FIG. 9 shows a more detailed flowchart of an approach to implement revalidation according to some embodiments of the invention. With some embodiments, revalidation is performed only during a hard parse, i.e., if a SQL statement was previously compiled and its query plan is available in the cursor cache (also called plan cache), the cached plan is shared by the query and no revalidation occurs. This design choice reduces the overhead imposed by revalidation when a plan is available in the cache and can readily be used. On the other hand, when the plan is not available in the cursor cache, the statement must be compiled which is a relatively long duration process.

At 902, compilation begins for a SQL statement. At the beginning of compilation, the SQL objects are loaded from the database's data diction. At 904, when the SQL objects (also SMOs or SQL Plan Management Objects) for the statement are loaded from the dictionary, if a SQL patch exists for the statement, then that SQL is also loaded.

At 906, the properties of the SQL patch are examined. This may occur, for example, by examining data from a separate AEM-specific dictionary table. The properties of the SQL patch are examined to determine the last time the patch was validated to be required. The lookup can be based on the patch signature.

A determination is made at 908 whether enough time has passed since the last revalidation for the SQL patch. If it is determined that not enough time has passed (e.g., a configurable threshold was not crossed) since the last revalidation, then the statement is not flagged for revalidation. Therefore, at 909, compilation and execution will proceed using the SQL patch.

If it is determined that enough time has passed (e.g., a configurable threshold was crossed) since the last validation, the statement is flagged for revalidation. A revalidation context is setup for the purpose. At 910, if the statement is subject to revalidation, the database will ignore the existing SQL patch for the first round of compilation. This ensures that statement is compiled as is, without the intervention of the patch.

A determination is made at 912 whether the compilation has succeeded or not. If the compilation succeeds, then this indicates at 920 that the patch is unnecessary as the error no longer occurs even without the patch. Hence, at 922, the SQL patch is marked to be dropped. At the end of compilation the database system will drop the patch.

If it is determined that the compilation has failed (e.g., the error is encountered), then this indicates at 914 that the patch is still required. At this point, at 916, the last-validated timestamp of the patch entry for the SQL statement is updated in the dictionary table, and the statement is transparently re-parsed. At 918, the re-parse is flagged as a "post-revalidation" parse and the optimizer recognizes it and attaches the SQL patch to the statement (e.g., does not ignore it this time).

Another round of compilation may ensue. The second round of the compilation is a regular compilation.

It is noted that if SQL patches are dropped due to revalidation, their corresponding entries in some dictionary tables may become obsolete. They are periodically purged from the system by a background task. Additionally, auto patches that have never been used (for example, due to SQL statements not being submitted again) are also purged by the background task after a threshold period.

Figure 10:
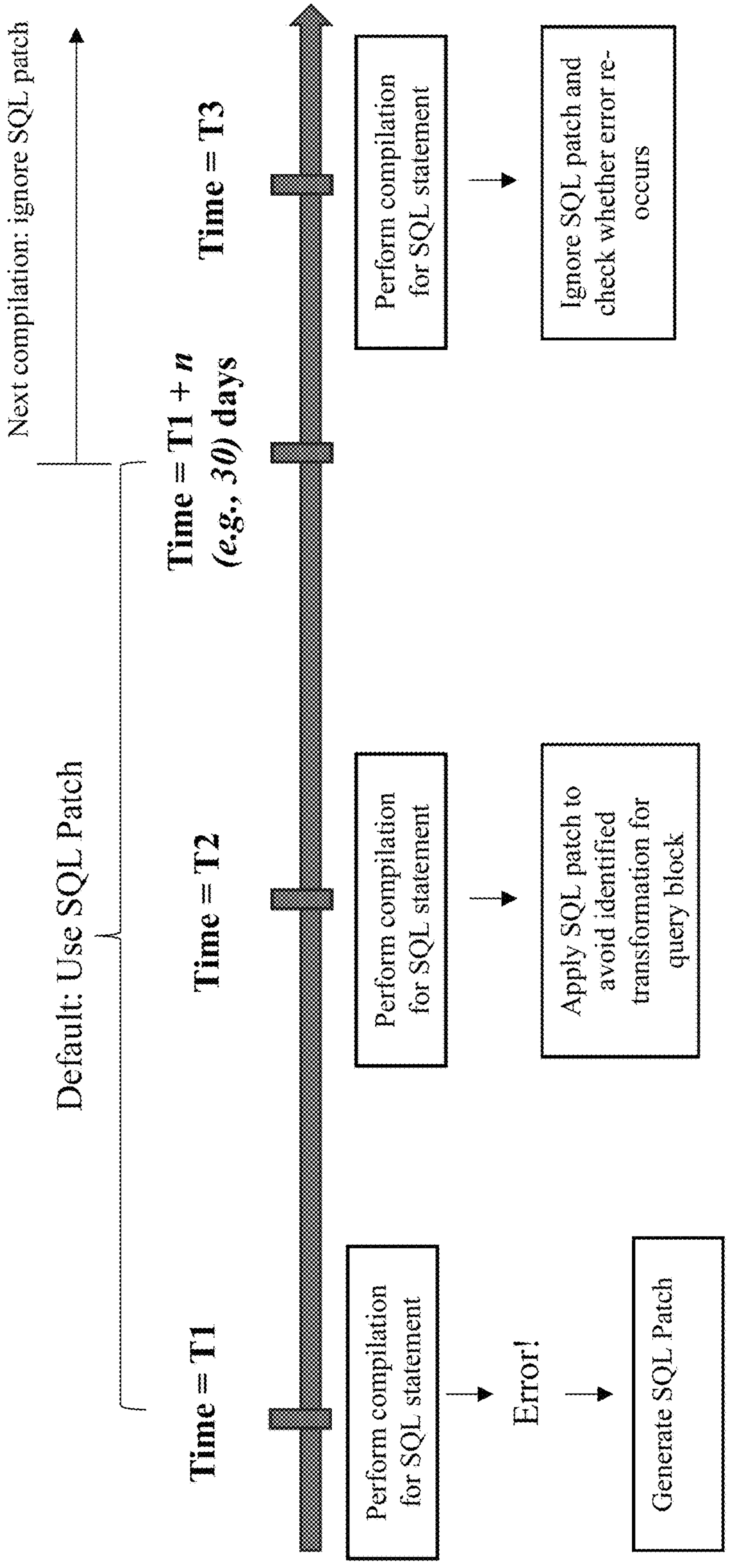
FIG. 10 shows an illustrative example of a revalidation flow.

FIG. 10 shows an illustrative example of a revalidation flow. This example shows a SQL patch that was generated at time T1. At T1, an error occurred during compilation of a SQL statement, resulting in the SQL patch being generated. The validation time for this SQL patch is thus set at T1, At time T2, the same SQL statement was received for compilation. A check is made for time T2 to see if enough time has elapsed since the last validation time so that a revalidation needs to be performed. Assume that the time period for revalidation is 30 days. Here, time T2 is less than 30 days beyond time T1. As such, the timeframe for revalidation has not elapsed. Therefore, the SQL patch will be applied for the compilation of the statement at time T2.

At time T3, the same SQL statement is again received for compilation. A check is made for time T3 to see if enough time has elapsed since the last validation time so that a revalidation needs to be performed. As before, assume that the time period for revalidation is 30 days. Here, time T3 is greater than 30 days beyond time T1. As such, the timeframe for revalidation has elapsed. Therefore, the SQL patch will be ignored, and compilation of the statement will proceed without the SQL patch to determine if it is still needed.

Figure 11:
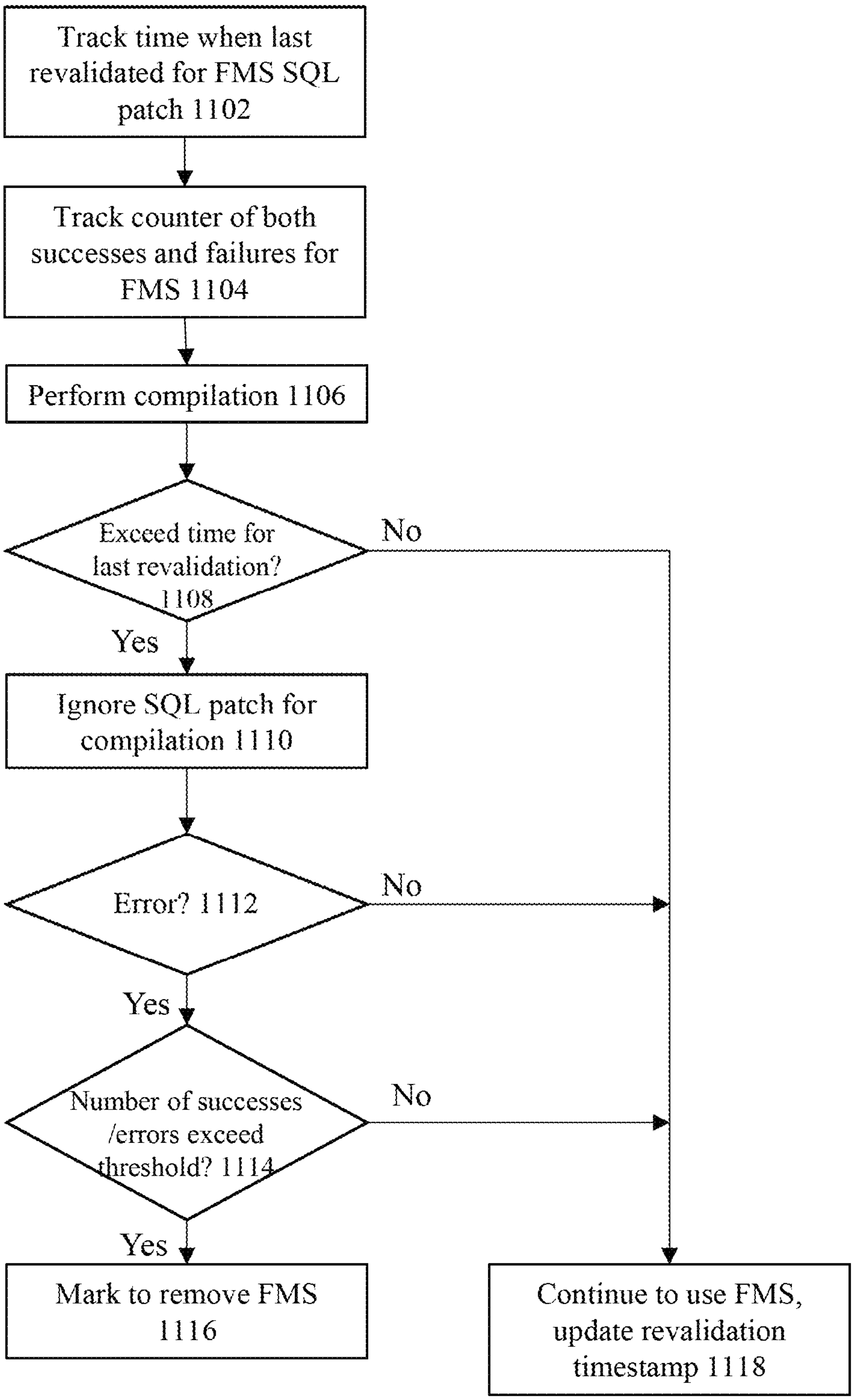
FIGS. 11 and 12 show alternate embodiments of the invention for revalidation.

FIG. 11 shows a flowchart of an alternate embodiment of the invention. Here, counters are used as part of the revalidation process to provide a more accurate assessment for a revalidation process for FMS-type SQL patches. The reason for using counters for FMS-type patches is because it may not always be effective or efficient to decide whether to revalidate a FMS patch merely upon a single error or a single success. Therefore, a success counter and/or an error counter may be used in conjunction with the previously described approach in order to perform revalidation on FMS patches.

The general idea for this embodiment is that multiple iterations of compilations can be performed after the revalidation time has expired. Instead of basing the revalidation decision upon just one compilation to identify success or failure, the database will allow multiple compilations to occur. Only after a certain number and/or percentage of successes and/or failures to occur will the system make a determination whether to revalidate the FMS-type SQL patch.

At 1106, compilation is performed for a SQL statement. A determination is made at 1108 whether a threshold time for last validation/revalidation has expired. If not, then the compilation is still within the threshold time period since the last validation/revalidation. Therefore, at 1118, compilation will proceed with the FMS patch.

If the threshold time from the last validation/revalidation has expired, then at 1110, compilation proceeds without using the FMS SQL patch. Tracking is performed at 1112 of the success or failure of the compilation. A success counter and/or an error counter may be incremented as a result of the compilation.

A determination is made at 1114 whether the number of successes, number of failures, and/or a percentage of success/failures has exceeded a threshold. If not, then a decision cannot yet be made whether to remove the FMS patch. Therefore, the current condition of being in a revalidation state stays in place, and continues to accept new compilation requests that will undergo this same process.

However, if a sufficient number of successes and/or failures have now been identified for the statement, then a determinations can now be made at 1116 whether to keep or drop the FMS patch. At this point, if the FMS patch is kept, then revalidation time is reset.

Figure 12:
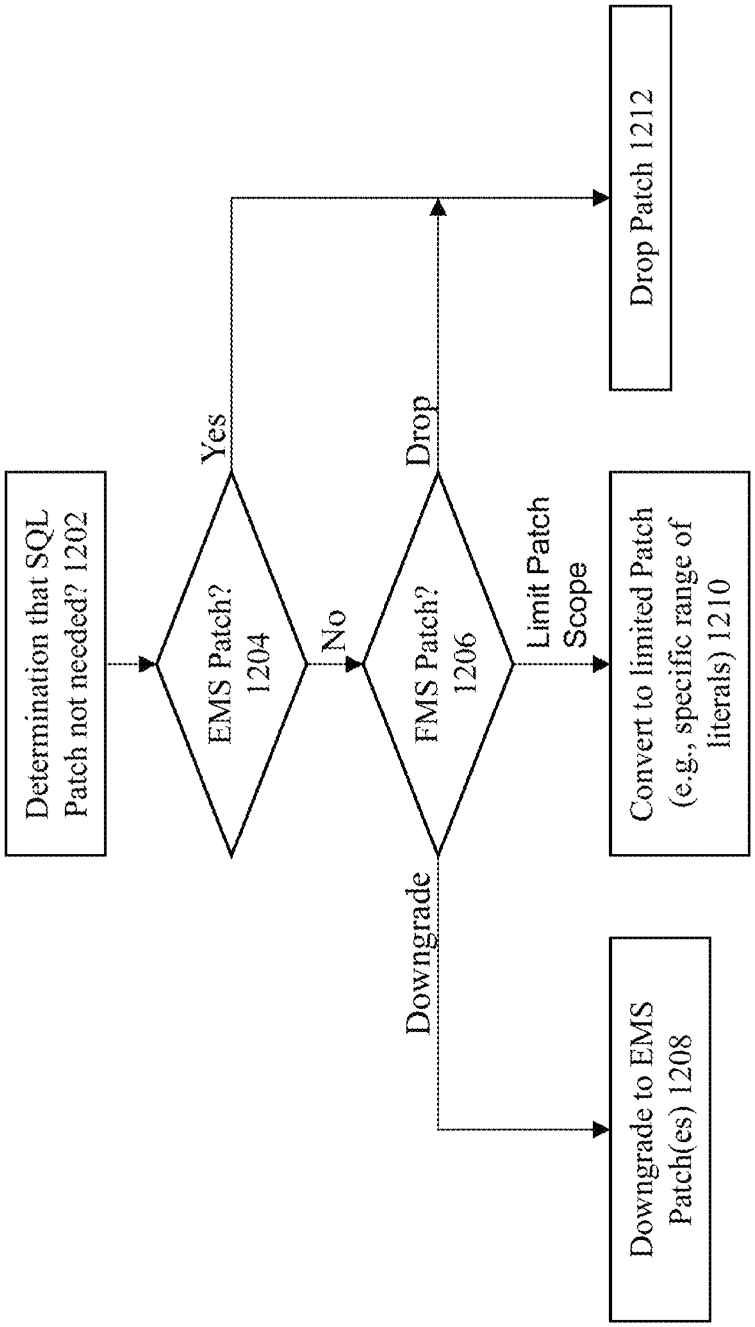

FIG. 12 shows a flowchart of an embodiment of the invention for making a finer granularity decision on validation/revalidation for SQL patches. The general idea is that the different types of SQL patches may needs to be treated differently if a decision is made to not keep a current version of the SQL patch.

At 1202, a determination is made that a given SQL patch is no longer needed. As discussed above, various criteria may be used to device whether to keep or not keep a SQL patch.

At 1204, the type of the SQL patch is checked to determine if it is an EMS-type patch. If so, then the decision to not keep the EMS-type SQL patch means that at 1212, that EMS patch can be completely dropped.

At 1206, the type of the SQL patch is checked to determine if it is an FMS-type patch. Here, a more complicated set of analysis is performed to determine how to handle the decision not to keep the FMS-type SQL patch.

It could be that the patch is not useful for any significant or meaningful set of literals that are within the scope of the FMS patch. In other words, the FMS patch is likely not to be useful across any, many, or most of the literals that are associated with the patch, and indeed may actually be harmful or produce inefficient results if applied. Therefore, in this situation, at 1212, it may be justified to just simply drop the entire FMS patch.

However, it is possible that the FMS patch is still useful, but not when applied universally across all literals. In this situation, there are two options to downgrade the FMS patch into a more useful patch.

A first option, at 1208, is to downgrade the FMS patch into one or more EMS patches. Here, a specific literal may identifiable for which the patch is still useful. This may particularly be the case if the FMS patch was even originally created based upon an upgrade of a previous EMS patch for a specific literal to the FMS patch.

A second option, at 1210, is to convert the broad FMS patch into a more-narrow FMS patch that is limited to one or more ranges of literal values. Here, a specific range of literals may identifiable for which the patch is still useful.

Therefore, what has been described is an improved approach to address compilation errors for database queries by using fine-grained hints. Some embodiments pertain to an approach to configure the scope of coverage for the patch. Some other embodiments pertain to validation/revalidation of the patches.

System Architecture Over View

Figure 13:
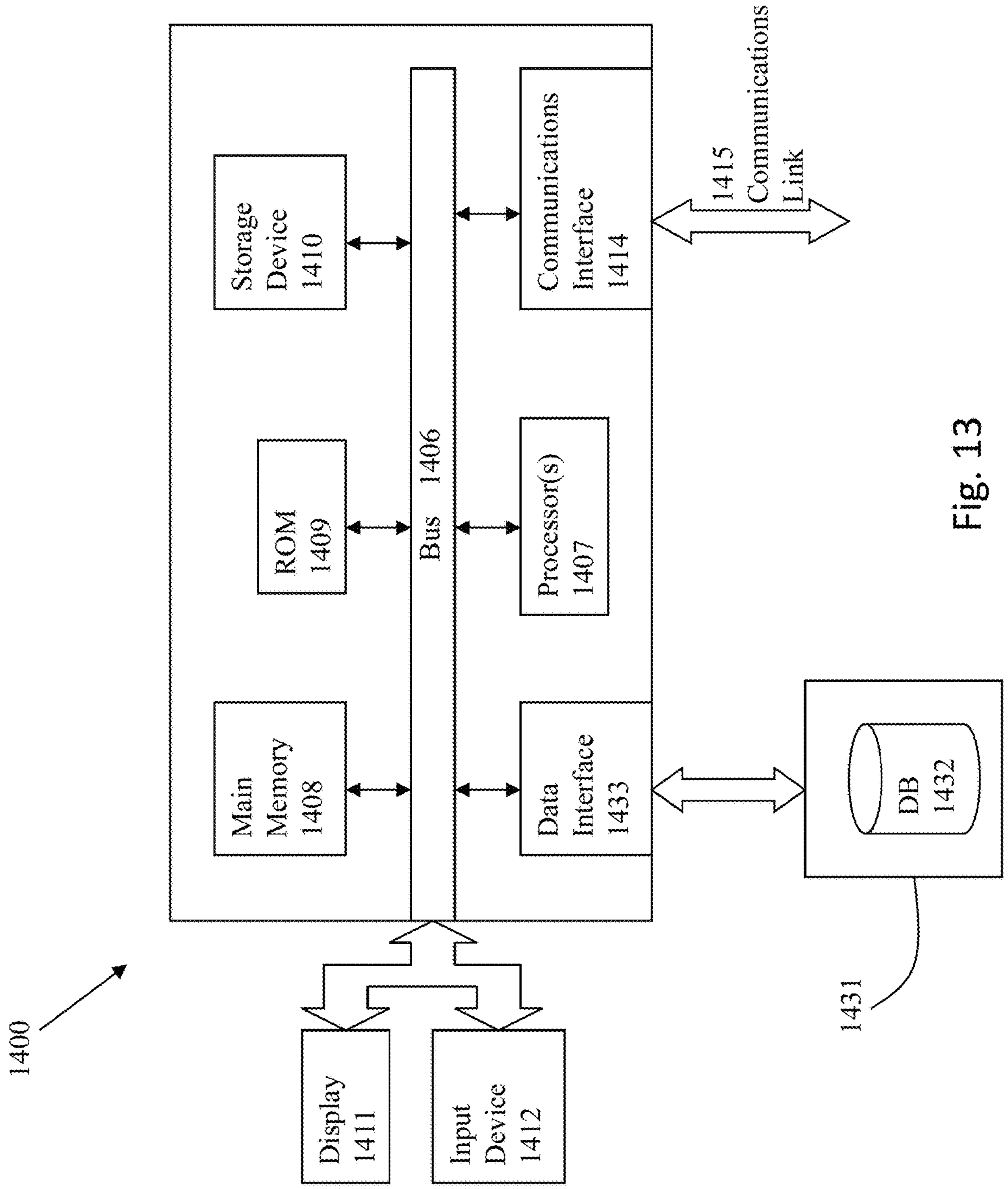
FIG. 13 is a block diagram of an illustrative computing system suitable for implementing an embodiment of the invention.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 14:
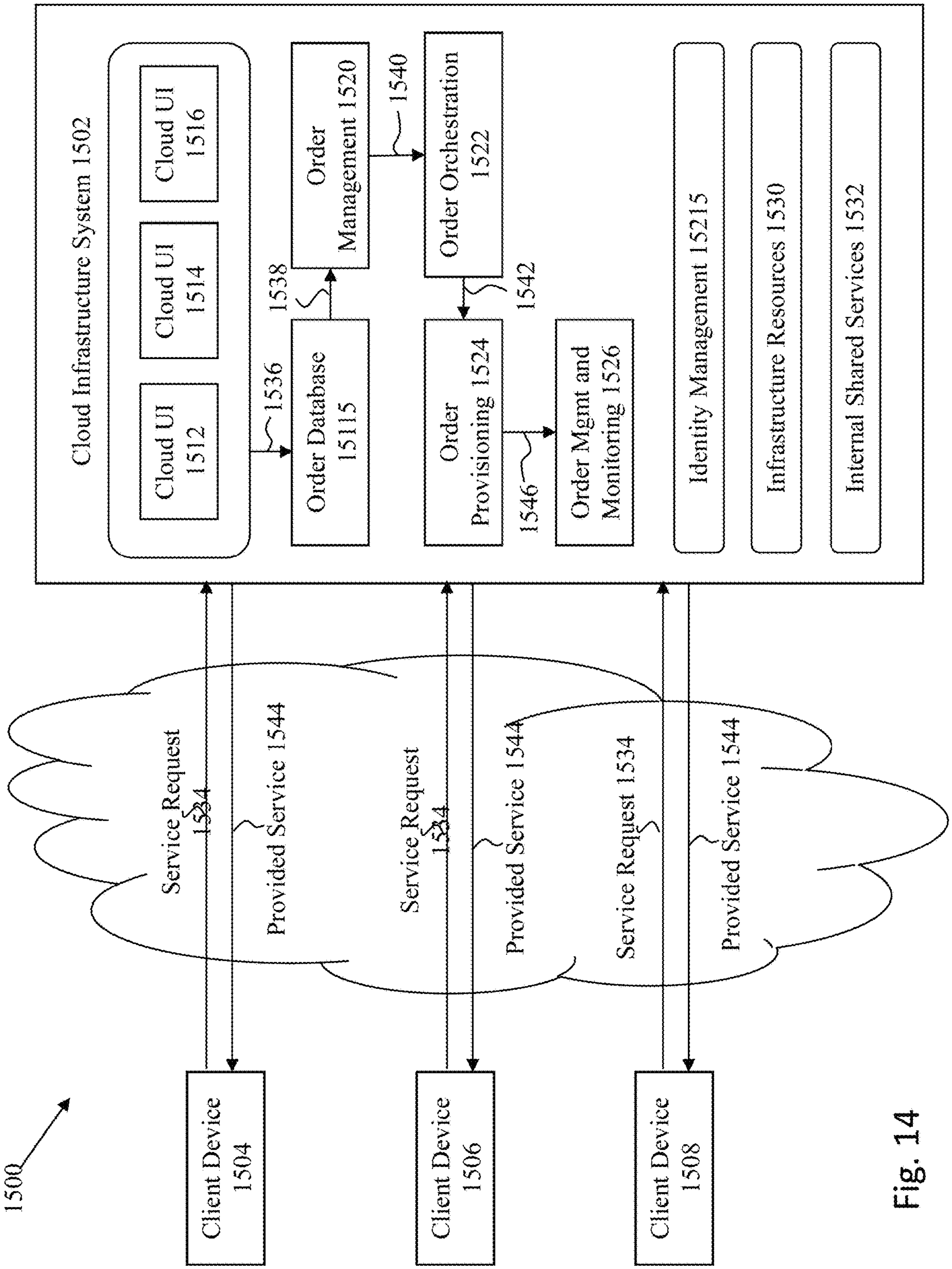
FIG. 14 is a block diagram of one or more components of a system environment in which services may be offered as cloud services, in accordance with an embodiment of the present invention.

FIG. 14 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 13. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method executed within a computerized database management system, the computer-implemented method comprising:

the computerized database management system
- receiving a computer-executable query from a client computing device of a user of the computerized database management system through a network;
- identifying a SQL hint directed to a query block of the computer-executable query, wherein the SQL hint is generic at a given position of the query block for a literal of the computer-executable query;
- receiving a request to perform compilation of the computer-executable query that includes the query block;
- determining whether criteria exists to avoid application of the SQL hint to the compilation of the computer-executable query;
- performing the compilation of the computer-executable query against the query block in response to a determination to avoid application of the SQL hint to the compilation of the computer-executable query, and
- revalidating for continued use of the SQL hint when the compilation of the computer-executable query against the query block results in an error, else marking the SQL hint for deprecation when the compilation of the computer-executable query against the query block does not result in an error, and converting the SQL hint to an alternate SQL hint that includes a range of literals at the given position of the query block instead of being generic at the given position in the query block.

2. The method of claim 1, wherein the criteria to avoid application of the SQL hint to the compilation of the computer-executable query corresponds to a periodic time period for performing revalidation of the SQL hint.

3. The method of claim 1, wherein the computerized database management system maintains a dictionary table that tracks properties for the SQL hint, the properties for the SQL hint comprises a previous time when revalidation occurred, and the previous time is checked against a time threshold to determine whether enough time has elapsed such since the previous time such that the criteria is met to avoid application of the SQL hint to the compilation.

4. The method of claim 3, wherein when the compilation of the computer-executable query against the query block results in an error, then updating the properties for the SQL hint in the dictionary table to reflect an updated revalidation time for the SQL hint.

5. The method of claim 1, wherein a success counter or a failure counter increments upon a respective successful or failed compilation of the query block, and revalidation of the SQL hint is performed when a success or failure count indicates a percentage that meets a threshold.

6. A computer program product embodied on a computer readable medium, the computer readable medium having stored thereon a sequence of instructions which, when executed by a processor of a computerized database system, executes acts of a computer implemented method comprising:

the computerized database system:
- receiving a computer-executable query from a client computing device of a user of the computerized database system through a network;
- identifying a SQL hint directed to a query block of the computer-executable query, wherein the SQL hint is generic at a given position of the query block for a literal of the computer-executable query;
- receiving a request to perform compilation of the computer-executable query that includes the query block;
- determining whether criteria exists to avoid application of the SQL hint to the compilation of the computer-executable query;
- performing the compilation of the computer-executable query against the query block in response to a determination to avoid application of the SQL hint to the compilation of the computer-executable query;

revalidating for continued use of the SQL hint when the compilation of the computer-executable query against the query block results in an error, else marking the SQL hint for deprecation when the compilation of the computer-executable query against the query block does not result in an error, and converting the SQL hint to an alternate SQL hint that includes a range of literals at the given position of the query block instead of being generic at the given position in the query block.

7. The computer program product of claim 6, wherein the criteria to avoid application of the SQL hint to the compilation of the computer-executable query corresponds to a periodic time period for performing revalidation of the SQL hint.

8. The computer program product of claim 6, wherein the computerized database management system maintains a dictionary table that tracks properties for the SQL hint, the properties for the SQL hint comprises a previous time when revalidation occurred, and the previous time is checked against a time threshold to determine whether enough time has elapsed such since the previous time such that the criteria is met to avoid application of the SQL hint to the compilation.

9. The computer program product of claim 8, wherein when the compilation of the computer-executable query against the query block results in an error, then updating the properties for the SQL hint in the dictionary table to reflect an updated revalidation time for the SQL hint.

10. The computer program product of claim 6, wherein a success counter or a failure counter increments upon a respective successful or failed compilation of the query block, and revalidation of the SQL hint is performed when a success or failure count indicates a percentage that meets a threshold.

11. A system, comprising:

a computerized database management system comprising:

a processor; and a memory for holding programmable code, wherein the programmable code includes instructions executable by the processor for executing a computer-implemented method comprising:

receiving a computer-executable query from a client computing device of a user of the computerized database system through a network;

identifying a SQL hint directed to a query block of the computer-executable query, wherein the SQL hint is generic at a given position of the query block for a literal of the computer-executable query;

receiving a request to perform compilation of the computer-executable query that includes the query block;

determining whether criteria exists to avoid application of the SQL hint to the compilation of the computer-executable query;

performing the compilation of the computer-executable query against the query block in response to a determination to avoid application of the SQL hint to the compilation of the computer-executable query; and revalidating for continued use of the SQL hint when the compilation of the computer-executable query against the query block results in an error, else marking the SQL hint for deprecation when the compilation of the computer-executable query against the query block does not result in an error, and converting the SQL hint to an alternate SQL hint that includes a range of literals at the given position of the query block instead of being generic at the given position in the query block.

12. The system of claim 11, wherein the criteria to avoid application of the SQL hint to the compilation of the computer-executable query corresponds to a periodic time period for performing revalidation of the SQL hint.

13. The system of claim 11, wherein the computerized database management system maintains a dictionary table that tracks properties for the SQL hint, the properties for the SQL hint comprises a previous time when revalidation occurred, and the previous time is checked against a time threshold to determine whether enough time has elapsed such since the previous time such that the criteria is met to avoid application of the SQL hint to the compilation.

14. The system of claim 13, wherein when the compilation of the computer-executable query against the query block results in an error, then updating the properties for the SQL hint in the dictionary table to reflect an updated revalidation time for the SQL hint.

15. The system of claim 11, wherein a success counter or a failure counter increments upon a respective successful or failed compilation of the query block, and revalidation of the SQL hint is performed when a success or failure count indicates a percentage that meets a threshold.

* * * * *